United States Patent
Clark et al.

(10) Patent No.: US 9,348,615 B1
(45) Date of Patent: May 24, 2016

(54) INTERFACE TRANSITIONING AND/OR TRANSFORMATION

(76) Inventors: Brendan Edward Clark, Rocky River, OH (US); Ronald Charles Krosky, Columbia, MD (US); Matthew Franklin Clapper, Hudson, OH (US)

(*) Notice: Subject to any disclaimer, the term of this patent is extended or adjusted under 35 U.S.C. 154(b) by 775 days.

(21) Appl. No.: 13/039,407

(22) Filed: Mar. 3, 2011

Related U.S. Application Data

(60) Provisional application No. 61/311,377, filed on Mar. 7, 2010.

(51) Int. Cl.
  *G06F 3/048* (2013.01)
  *G06F 9/44* (2006.01)

(52) U.S. Cl.
  CPC .................................... *G06F 9/4446* (2013.01)

(58) Field of Classification Search
  USPC ........................................................ 715/744
  See application file for complete search history.

(56) References Cited

U.S. PATENT DOCUMENTS

| | | | | |
|---|---|---|---|---|
| 8,099,664 | B2* | 1/2012 | Kureshy et al. | 715/705 |
| 2005/0054381 | A1* | 3/2005 | Lee et al. | 455/557 |
| 2006/0107219 | A1* | 5/2006 | Ahya et al. | 715/745 |
| 2006/0242585 | A1* | 10/2006 | Cutsinger et al. | 715/744 |
| 2008/0307333 | A1* | 12/2008 | McInerney et al. | 715/764 |
| 2009/0293004 | A1* | 11/2009 | Emam et al. | 715/762 |

OTHER PUBLICATIONS

Microsoft, "Up to speed with PowerPoint 2007", https://support.office.com/en-us/article/Up-to-speed-with-PowerPoint-2007-c3775a09-9028-4252-9601-0fac75ee72bd, Published Apr. 6, 2007, Retrieved Dec. 30, 2015.*

Raoul, "Yii Extensions—EGuiders", http://s172418307.onlinehome.fr/project/yiiDemo/index.php?r=extension/eguiders, Published Oct. 25, 2011, Retrieved Dec. 30, 2015.*

* cited by examiner

*Primary Examiner* — Chameli Das
*Assistant Examiner* — Joanne Macasiano

(57) ABSTRACT

Systems, methods, and other embodiments associated with transitioning are described. In one embodiment, a method comprises analyzing at least one interface to produce an interface analysis result. The method also comprises causing a transformation of at least one constituent element based, at least in part, on the interface analysis result.

20 Claims, 19 Drawing Sheets

INTERFACE TRANSITIONING AND/OR TRANSFORMATION

CROSS REFERENCE TO RELATED APPLICATIONS

This application claims the benefit of U.S. provisional application Ser. No. 61/311,377 filed on Mar. 7, 2010, which is hereby wholly incorporated by reference.

BACKGROUND

A computer can run a computer program. The computer program can cause an interface to be displayed on a monitor associated with the computer. The interface can enable a person to use functionality associated with the computer program. For example, the interface of a word processing program can include an icon that depicts a partially opened file folder. This icon can enable the person to quickly open a document in the word processing program.

BRIEF DESCRIPTION OF THE FIGURES

The accompanying drawings, which are incorporated in and constitute a part of the detailed description, illustrate various example systems, methods, and other example embodiments of various innovative aspects. These drawings include.

Figure 1:
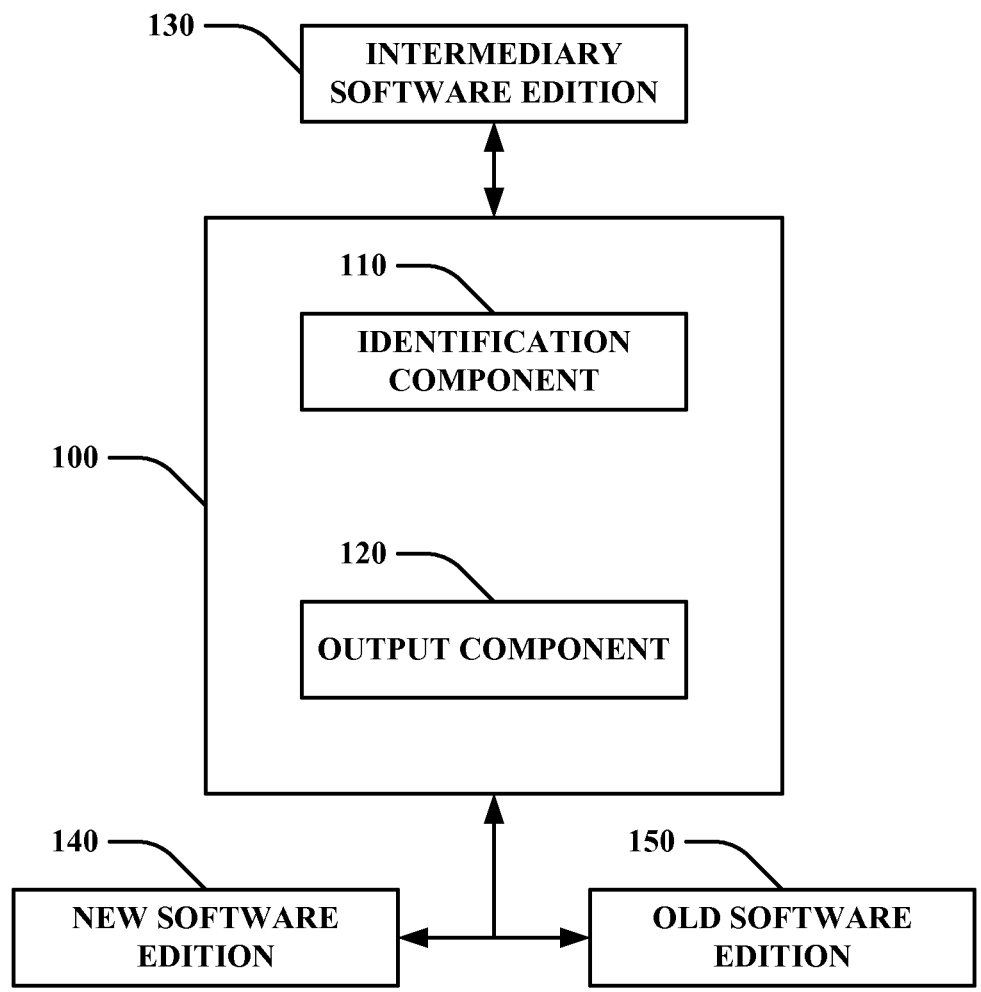
FIG. 1 illustrates one embodiment of a system with an identification component and an output component.

It will be appreciated that illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale. These elements and other variations are considered to be embraced by the general theme of the figures, and it is understood that the drawings are intended to convey the spirit of certain features related to this application, and are by no means regarded as exhaustive or fully inclusive in their representations. Additionally, it is to be appreciated that the designation 'FIG.' represents 'Figure'. In one example, 'FIG. 1' and 'FIG. 1' are referring to the same drawing.

The terms 'may' and 'can' are used to indicate a permitted feature, or alternative embodiments, depending on the context of the description of the feature or embodiments. In one example, a sentence states 'A can be AA' or 'A may be AA'. Thus, in the former case, in one embodiment A is AA, and in another embodiment A is not AA. In the latter case, A may be selected to be AA, or A may be selected not to be AA. However, this is an example of A, and A should not be construed as only being AA. In either case, however, the alternative or permitted embodiments in the written description are not to be construed as injecting ambiguity into the appended claims. Where claim 'x' recites A is AA, for instance, then A is not to be construed as being other than AA for purposes of claim 'x.' This is construction is so despite any permitted or alternative features and embodiments described in the written description.

DETAILED DESCRIPTION

Described herein are example systems, methods, and other embodiments associated with transitioning, such as interface transitioning. A computer can include a first version of a computer program, where the computer program includes an interface, such as a graphical user interface, as well as other aspects. The computer program can receive an update or replacement (e.g., from a creator of the computer program, from a third-party, etc.). The computer program with the update or a replacement computer program can be considered a second version of the computer program. The second version of the computer program can differ from the first version in a number of different ways. In one example, changing from the first version to the second version can cause changes in the interface. For example, an element of the interface can be moved (e.g., caused to be in a different location on a display), be removed, be added, visually change (e.g., change in shape, color, etc.), have different functionality, and others.

A change from a first version to a second version can be difficult for a user. For example, a feature (e.g., an engagable icon that can cause a function to occur) in the first version may be easily accessible (e.g., available on a desktop, available on a start page of a word processing program, and others). However, the feature in the second version may be in a new location and/or be less easily accessible (e.g., a feature is buried several file folders or menu selections down). The user may not be readily aware of where the feature went, be displeased at the new location of the feature, and others.

To alleviate this difficulty, a transitioning experience can be presented to the user. In one example, when the user uses the second version for a first time, the feature can be in a place where the icon is located in the first version. When the user attempts to use the feature, instead of the feature being available, the user can be taken on a tutorial of where to find the new feature and/or be asked if the user would like the feature be in a location of the first version or the second version. It is to be appreciated by one of ordinary skill in the art that this is but one example of a possible transitioning experience.

While these provide particular aspects of at least one embodiment, other applications involving different features, variations or combinations of aspects will be apparent to those skilled in the art based on the following details relating to the drawings and other portions of this application. Additionally, when a reference is made herein to a person, it is to be appreciated that the reference can be made to an organism or system.

The following paragraphs include definitions of selected terms discussed at least in the detailed description. The definitions may include examples used to explain features of terms and are not intended to be limiting. In addition, where a singular term is disclosed, it is to be appreciated that plural terms are also covered by the definitions. Conversely, where a plural term is disclosed, it is to be appreciated that a singular term is also covered by the definition. In addition, a set can include one or more member(s).

References to "one embodiment", "an embodiment", "one example", "an example", and so on, indicate that the embodiment(s) or example(s) so described may include a particular feature. The embodiment(s) or example(s) are shown to highlight one feature and no inference should be drawn that every embodiment necessarily includes that feature. Multiple usages of the phrase "in one embodiment" and others do not necessarily refer to the same embodiment; however this term may refer to the same embodiment. It is to be appreciated that multiple examples and/or embodiments may be combined together to form another embodiment.

"Computer-readable medium", as used herein, refers to a medium that stores signals, instructions, and/or data. A computer may access a computer-readable medium and read information stored on the computer-readable medium. In one embodiment, the computer-readable medium stores instruction and the computer can perform those instructions as a method. The computer-readable medium may take forms, including, but not limited to, non-volatile media (e.g., optical disks, magnetic disks, and so on), and volatile media (e.g., semiconductor memories, dynamic memory, and so on). Example forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Component", "logic", "module" and the like as used herein, includes but is not limited to hardware, firmware, software stored or in execution on a machine, a routine, a data structure, and/or at least one combination of these (e.g., hardware and software stored). Component, logic, module, and interface may be used interchangeably. A component may be used to perform a function(s) or an action(s), and/or to cause a function or action from another component, method, and/or system. A component may include a software controlled microprocessor, a discrete logic (e.g., ASIC), an analog circuit, a digital circuit, a programmed logic device, a memory device containing instructions, a process running on a processor, a processor, an object, an executable, a thread of execution, a program, a computer and so on. A component may include one or more gates, combinations of gates, or other circuit components. Where multiple components are described, it may be possible to incorporate the multiple components into one physical component. Similarly, where a single component is described, it may be possible to distribute that single component between multiple physical components. In one embodiment, the multiple physical components are distributed among a network. By way of illustration, both/either a controller and/or an application running on a controller can be one or more components.

FIG. 1 illustrates one embodiment of a system 100 with an identification component 110 and an output component 120. The system 100 can access (e.g., communicate with, be part of, etc.) an electronic device (e.g., personal computer, mobile telephone, smart phone, digital music player, industrial interface, and others) that includes a display. The display can present an interface for a computer program. For example, a computer operating system can include a desktop interface with icons, information (e.g., a clock in a lower right-hand corner), and others. The computer program can experience a change such as an update (e.g., version 1.0 to version 1.1) or be replaced (e.g., operating system 2009 to operating system 2010). As part of the change, the interface can be modified. For example, in operating system 2009 the clock is in the lower right-hand corner while in operating system 2010 the clock is in the lower left-hand corner. A change, such as the clock movement, can be confusing for a person using the electronic device. For example, the person can expect the clock to be in the lower right-hand corner for operating system 2010 since that is where the clock is located in operating system 2009. The system 100 can help ease the person through the change.

The identification component 110 can be configured to identify an intermediary software edition 130. The output component 120 can be configured to cause the intermediary software edition 130 to be disclosed. For example, the intermediary software edition can be an intermediary interface and can be disclosed on the display. The intermediary software edition 130 can forward use of a new software edition 140 over an old software edition 150. For example, forwarding use can encourage a person to use the new software edition 140, be more comfortable using the new software edition, and others.

In one embodiment, the new software edition 140 and the old software edition 150 are different versions of a program. For example, the old software edition 150 is version 1.1 while the new software edition is version 1.2. In one embodiment, the new software edition 140 and the old software edition 150 are different programs. In one example, the new software edition 140 can be edition three of a word processing program from company A while the old software edition 150 can be edition two of the word processing program from company A. In one example, the new software edition 140 can be a new generation word processing program from company A while the old software edition 150 can be an old generation word processing program from company A. In one example, the new software edition 140 can be a word processing program from company A while the old software edition 150 can be a word processing program from company B.

In one embodiment, the intermediary software edition 130, new software edition 140, and old software edition 150 are computer programs. In one embodiment, the intermediary software edition 130, new software edition 140, and old software edition 150 are interfaces. In one embodiment, the intermediary software edition 130, new software edition 140, and old software edition 150 are instruction sets (e.g., instructions for a computer to use to cause transitioning from the old software edition 150 to the new software edition 140).

In one embodiment, the intermediary software edition 130 is a first interface, the new software edition 140 is a second interface, and the old software edition 150 is a third interface. The first interface includes at least one aspect of the second interface and the first interface includes at least one aspect of the third interface. Thus, the intermediary software edition 130 can incorporate aspects from the new software edition 140 and the old software edition 150. For example, the old software edition 150 can include a first icon and the new software edition 140 can include a second icon. The intermediary software edition 130 can include as aspects the first icon and the second icon (e.g., where the first icon and second icon have similar or identical functionality), an icon that is a merger of the first icon and the second icon, and others. The first icon and second icon can be different icons or the same icon at different locations on an interface. However, it is to be appreciated that the intermediary software edition 130 can have aspects that are not found in the new software edition 140 or the old software edition. Returning to the example of the first icon and the second icon, the intermediary software edition 130 can include a third icon that is not an aspect of the new software edition 140 or the old software edition 150. While interfaces are discussed, it is to be appreciated by one of ordinary skill in the art that facets of this paragraph are not limited to interfaces.

In one embodiment, the intermediary software edition 130 can be a first interface, where the new software edition 140 can be a second interface, and the old software edition 150 can be a third interface. The first interface is made up of aspects essentially exclusively from the second interface and the third interface. Essentially exclusively can include being made up only of aspects from the second interface and third interface, being made up of a majority of aspects from the second interface and the third interface, be a merger of the first interface and the second interface and when a merger is not appropriate (e.g., impossible, impractical, causes a confusing result, etc.) new aspects are created, and others. While interfaces are discussed, it is to be appreciated by one of ordinary skill in the art that facets of this paragraph are not limited to interfaces.

When reference to multiple interfaces are made (e.g., first interface, second interface, third interface, etc.), it is to be appreciated by one of ordinary skill in the art that this can refer to more than one actual interface, one interface in different stages (e.g., one interface is used where the first interface is a first configuration of the one interface, the second interface is a second configuration of the one interface, etc.), multiple editions of an interface (e.g., stored in a memory), and others.

Figure 2:
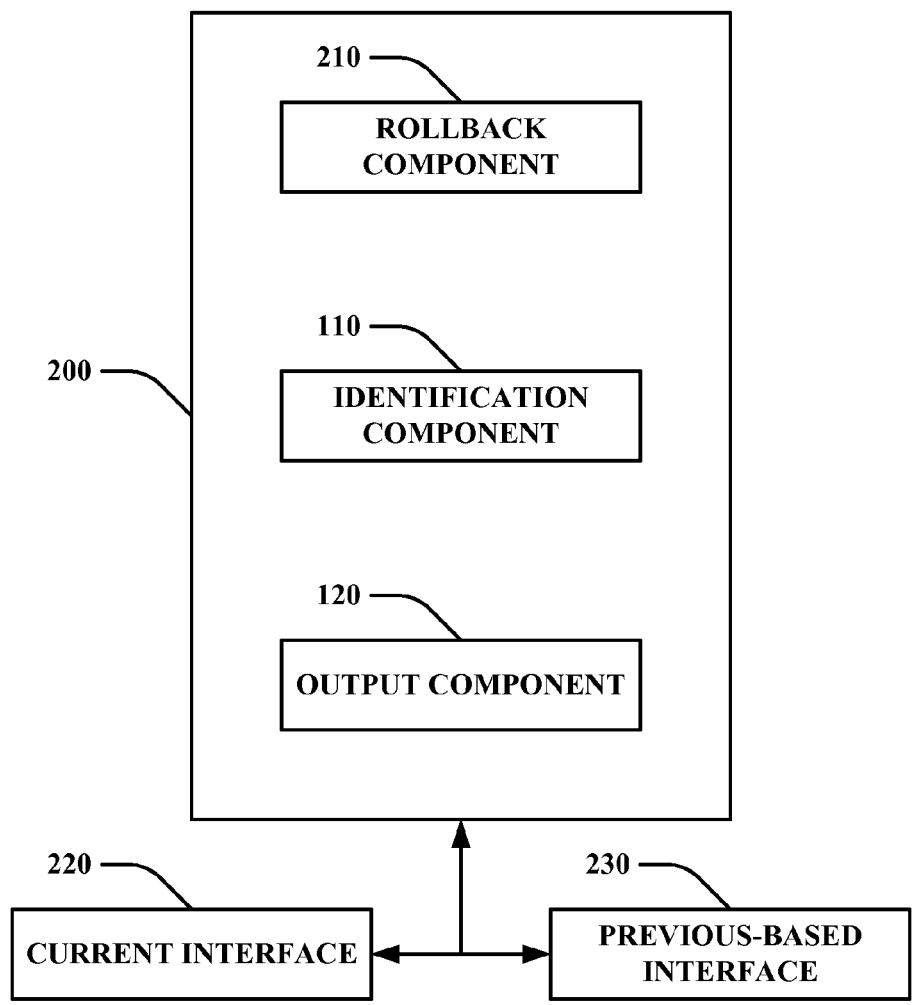
FIG. 2 illustrates one embodiment of a system with a rollback component, the identification component, and the output component.

FIG. 2 illustrates one embodiment of a system 200 with a rollback component 210, the identification component 110, and the output component 120. The rollback component 210 can work in conjunction with the intermediary software edition 130 of FIG. 1. The intermediary software edition 130 of FIG. 1 can include multiple editions. For example, the intermediary software edition 130 of FIG. 1 can include multiple interfaces that forward use of the an old interface to a new interface (e.g., where the old software edition 150 of FIG. 1 is the old interface and the new software edition 140 of FIG. 1 is the new interface).

In one example, the system 200 can be employed to facilitate a transition from an old interface to a new interface (e.g., due to an update, due to a new program being used, and others). The system 200 can cause a transition from the old interface to a first interface, where the first interface is more similar to the old interface than the new interface. The first interface can function to train a person on aspects of the new interface while being in a familiar construct of the old interface. From the first interface, the system 200 can cause transition to a second interface that is a merger of the old interface and the new interface. From the second interface, the system 200 can cause a transition to a third interface that is more similar to the new interface than the older interface. Finally, the third interface can be transitioned into the new interface. While three interfaces are disclosed in this example, it is to be appreciated by one of ordinary skill in the art that less than or more than three interfaces (e.g., intermediary interfaces that facilitates transition from one interface to another interface) can be used in a transitioning sequence.

In the above example, a person may have difficulty in a transition. For example, from the user can become confused on where items are located from the first interface to the second interface. The system 200 can function to alleviate this confusion. In one embodiment, the system 200 can employ the rollback component 210. The rollback component 210 can be configured to transition from (e.g., return to) a current interface 220 (e.g., the second interface) to a previous-based interface 230 (e.g., the first interface or the old interface). The intermediary software edition 130 of FIG. 1 can comprise the current interface 220 and the previous-based interface 230.

In one embodiment, the rollback component 210 can become aware of the person having difficulties in the transition. The rollback component 210 can gather information related to the person's difficulties and evaluate the gathered information. Based on this evaluation, the rollback component 210 can determine if a rollback to a previous interface itself is appropriate or if a new interface based on a previous interface should be disclosed. In response to determining that the new interface should be disclosed, the rollback component 210 can create the new interface and cause the new interface to be disclosed. The new interface can function to guide the person past their difficulties. The new interface can be considered an example of the previous-based interface 230.

Figure 3:
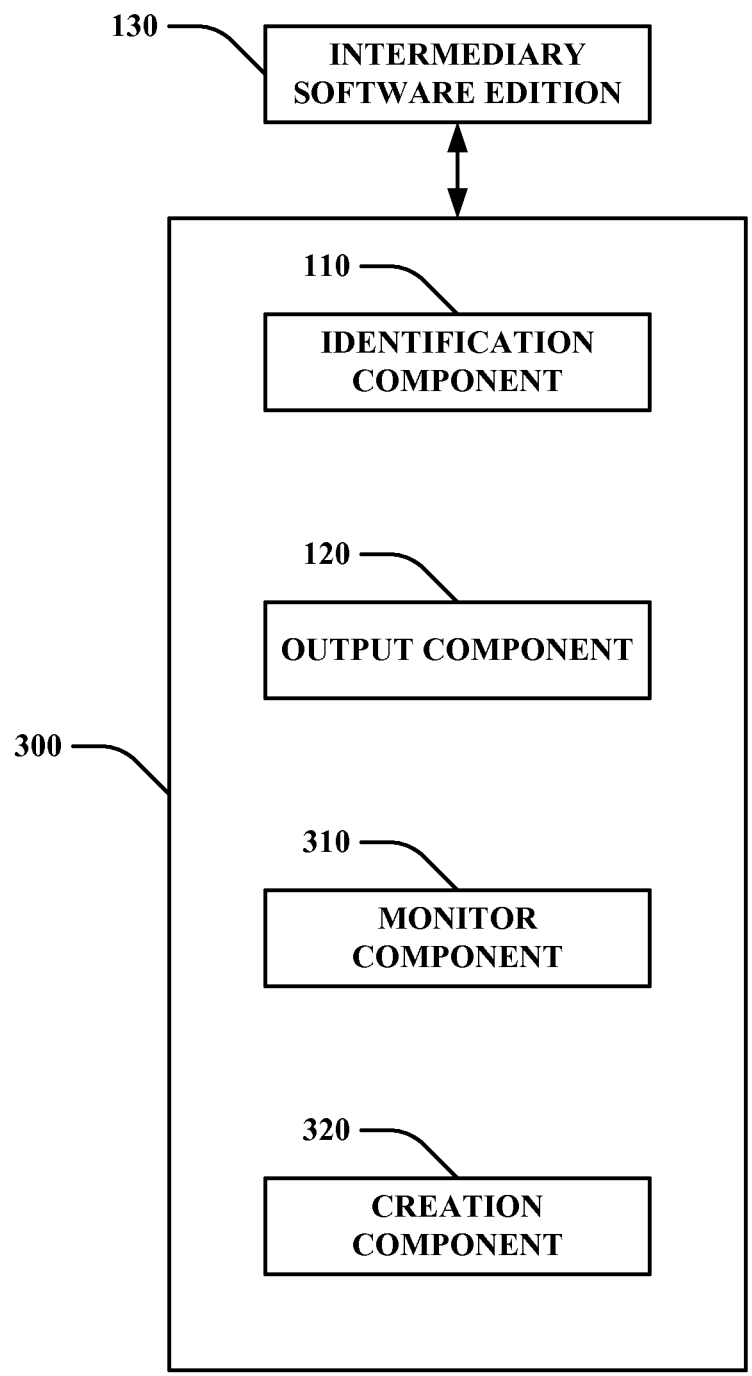
FIG. 3 illustrates one embodiment of a system with the identification component, the output component, a monitor component, and a creation component.

FIG. 3 illustrates one embodiment of a system 300 with the identification component 110, the output component 120, a monitor component 310, and a creation component 320. The monitor component 310 can be configured to make an observation. The creation component 320 can be configured to produce (e.g., generated, output with modification, and others) the intermediary software edition 130 based, at least in part, on the observation.

In one embodiment, the intermediary software edition 130 can be customized to a specific user, to a group of users, and others. The monitor component 310 can make an observation (e.g., a group of one or more individual observations). The creation component 320 can evaluate the observation to determine how to transition a user from using an old interface to a new interface. Based, at least in part, on this evaluation (e.g., which is ultimately based, at least in part, on the observation), the creation component 320 can create the intermediary software edition 130.

In one embodiment, the observation can include how an entity (e.g., a person) responds to a previously presented intermediary software edition that forwards use of the new software edition over the old software edition. For example, a company can develop an interface update with a first intermediary software update and this interface update and first intermediary software update can be downloaded by customers. However, the interface update can be relatively unsuccessful (e.g., customers have a difficult time learning a new interface feature). The observation can identify that the interface is relatively unsuccessful. Based on this observation, the creation component 320 can alter the previously presented intermediary software edition into the intermediary software edition 130 that is identified by the identification component 110.

In one embodiment, the observation can include an analysis of a historical record of how an entity group (e.g., one or more people) responds to at least one previously presented intermediary software edition. In one example, the entity group can be a user to whom intermediary software edition 130 is presented. For example, the user can experience multiple previous transitioning experiences (e.g., be subjected to multiple previous intermediary software editions). In one example, the system 300 can function under an update for a word processing program on a computer of the user. The historical record can be accessed by the system 300 and include a record for a previous word processing transitioning and a previous spreadsheet transitioning. Based, at least in part, on how the user responded to these previous transitioning, the creation component 320 can tailor the intermediary software edition 130 to the user.

In one example, the entity group is a group of one or more people with a similarity to a designated user. For example, a user that is subjected to an interface update can be represented by information, such as demographic information (e.g., age, education level, computer experience, and others), contextual information (e.g., time of day of transitioning, programs running when the system 300 operates, devices running (e.g., television) when the system 300 operates, and others), and others. Other users who meet this information can be evaluated (e.g., through historical records of these other users) and based on this evaluation, the creation component 320 can produce the intermediary software edition 130.

In one embodiment, the monitor component 310 can make the observation and use this observation to update the historical record. In one embodiment, the monitor component 310 can make the observation and send this observation to a second, where the second system uses the observation in creation of another intermediary software edition.

Figure 4:
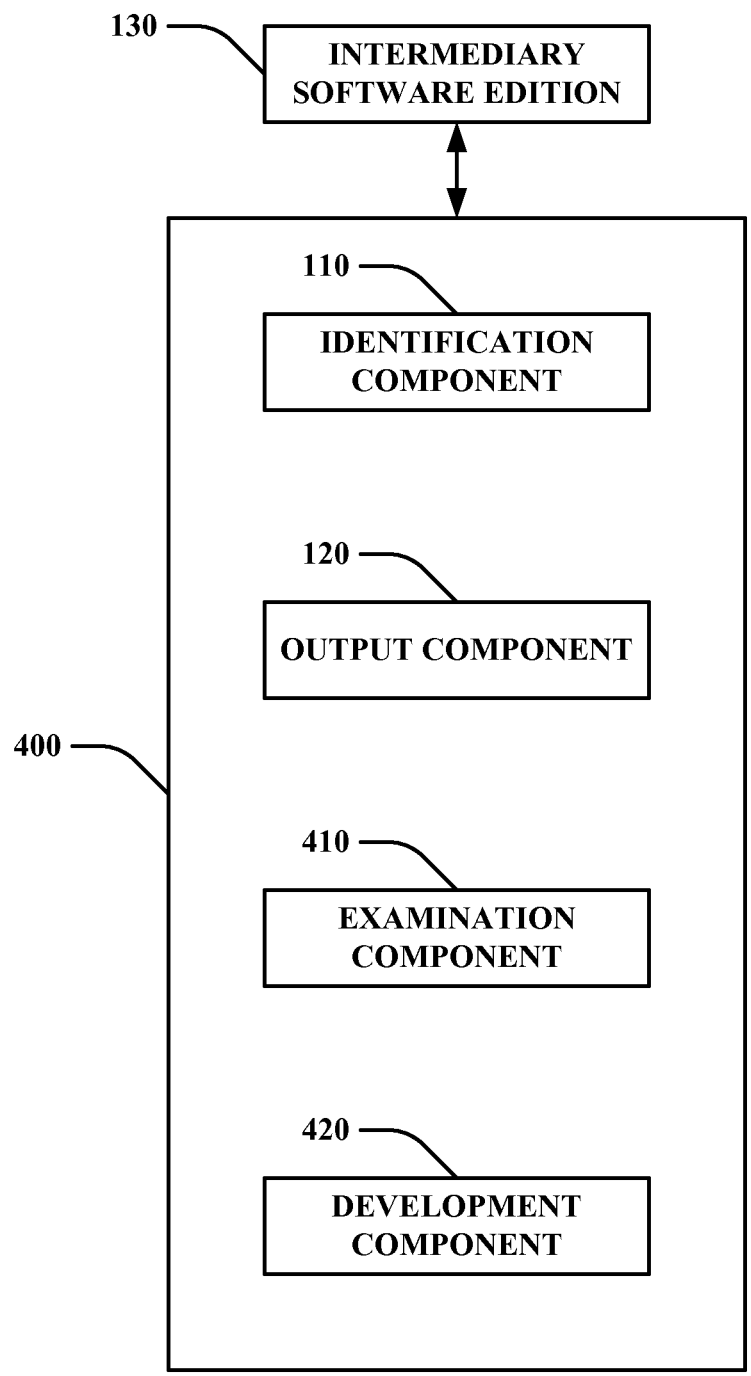
FIG. 4 illustrates one embodiment of a system with the identification component, the output component, an examination component, and a development component.

FIG. 4 illustrates one embodiment of a system 400 with the identification component 110, the output component 120, an examination component 410, and a development component 420. The examination component 410 can be configured to monitor a response of an entity (e.g., a user) to the intermediary software edition 130. The development component 420 can be configured to create a training program for the entity based, at least in part, on the response.

In one embodiment, a user can be presented with the intermediary software edition 130. For example, the intermediary software edition 130 can be a transition interface that is used to transition from an old interface to a new interface. The examination component 410 can observe how the user interacts with the transitioning interface. Based on this interaction, the development component 420 can create a training program. For example, a user can historically use a command quite often in the old interface. In the transition interface, the command moved to a new location because in the new interface the command is in the new location. While using the transition interface, the user may not be using the command, the user may be opening and closing various folders in a certain situation (e.g., an indication that the user is looking for something in a situation similar to when the user previously used the command), and others. The development component 420 can draw an inference that the user is having difficulties finding the command. In response to drawing this inference, the development component 420 can create a training program for the user, where the training program assists the user to find the command. In one example, the training program can be a message to the user on where to find the command and/or a series of instructions for the user to follow to find the command. Feedback can be gained for the training program and be used in creation of subsequent training programs.

Figure 5:
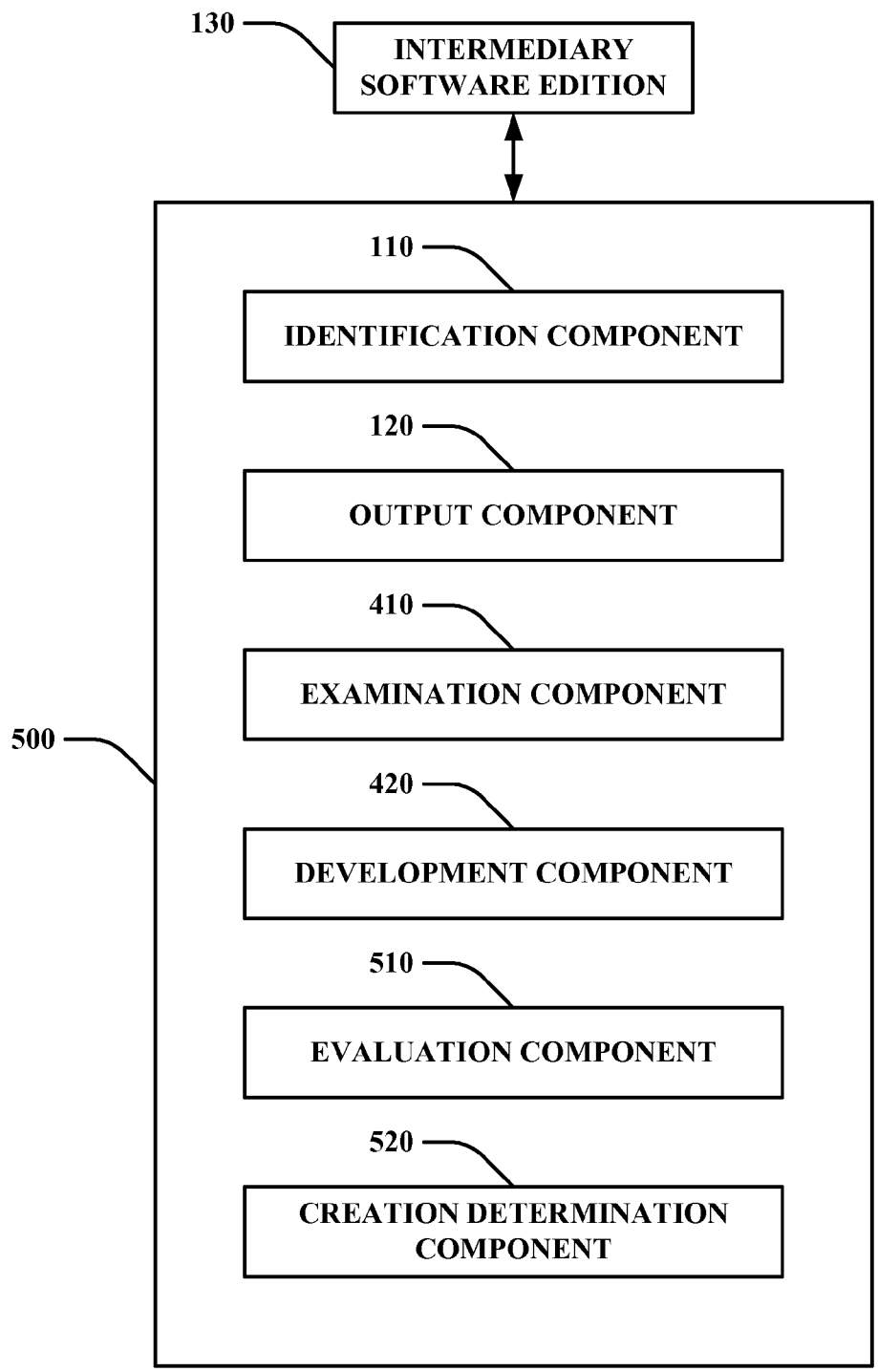
FIG. 5 illustrates one embodiment of a system with the identification component, the output component, the examination component, the development component, an evaluation component, and a creation determination component.

FIG. 5 illustrates one embodiment of a system 500 with the identification component 110, the output component 120, the examination component 410, the development component 420, an evaluation component 510, and a creation determination component 520. The evaluation component 410 can be configured to analyze the response (e.g., a response by an entity to the intermediary software edition 130). The creation determination component 520 can be configured to make a determination on if the training program should be created (e.g., created by the development component 420). The development component 420 can create the training program in response to the determination being that the training program should be created.

The system 500 can be used in determining if creating a training program is appropriate (e.g., anticipated to be beneficial to the entity). If a determination is made that creating the training program is appropriate, then the system 500 can determine how to create the training program.

In one example, the examination component 410 can observe how a user responds to an intermediary software edition 130 (e.g., implementing as an interface). For example, the examination component 410 can observe how quickly a user responds to an instruction, deviations from a normal usage pattern (e.g., running fewer commands per minute than normal, possibly indicating difficulty adjusting to a different interface), how many errors the user makes regarding the interface, etc. The evaluation component 510 can make inferences based on observations of the examination component 410. For example, if the user is making fewer commands per minute (or other time frame) than usual (e.g., average commands for the user over a time frame), then an inference can be drawn that the user is struggling with the different interface. The evaluation component 510 can compile statistical information on user activity, interface functioning, and others. The evaluation component 510 can output an evaluation result, where the evaluation result can include inferences, compiled statistical information, and others.

Based on the evaluation result, the creation determination component 520 can determine if the training program should be created based, at least in part, on the evaluation result. In one example, if the evaluation result shows that a user is slightly under-performing in using a new interface, then an inference can be drawn that this is a normal adjustment and a training program should not be generated (however, even slight under-performance may still warrant a training program). In one example, if the evaluation result shows that the user is significantly under performing in using a new interface, then a determination can be made to create the training program.

In addition to determining if the training program should be created, the creation determination component 520 can determine how the training program should be created (e.g., scope of the training program (e.g., be global for the different interface, focus on one aspect (e.g., an icon or command), and others), depth of the training program (e.g., complexity level, how much help a user is given, and others), what resources are used to create the training program (e.g., one or more physical components such as memory, one or more personal aspects such as user history, one or more global aspects such as how other users respond to the different interface or intermediary software edition 130, and others), and others.

Figure 6:
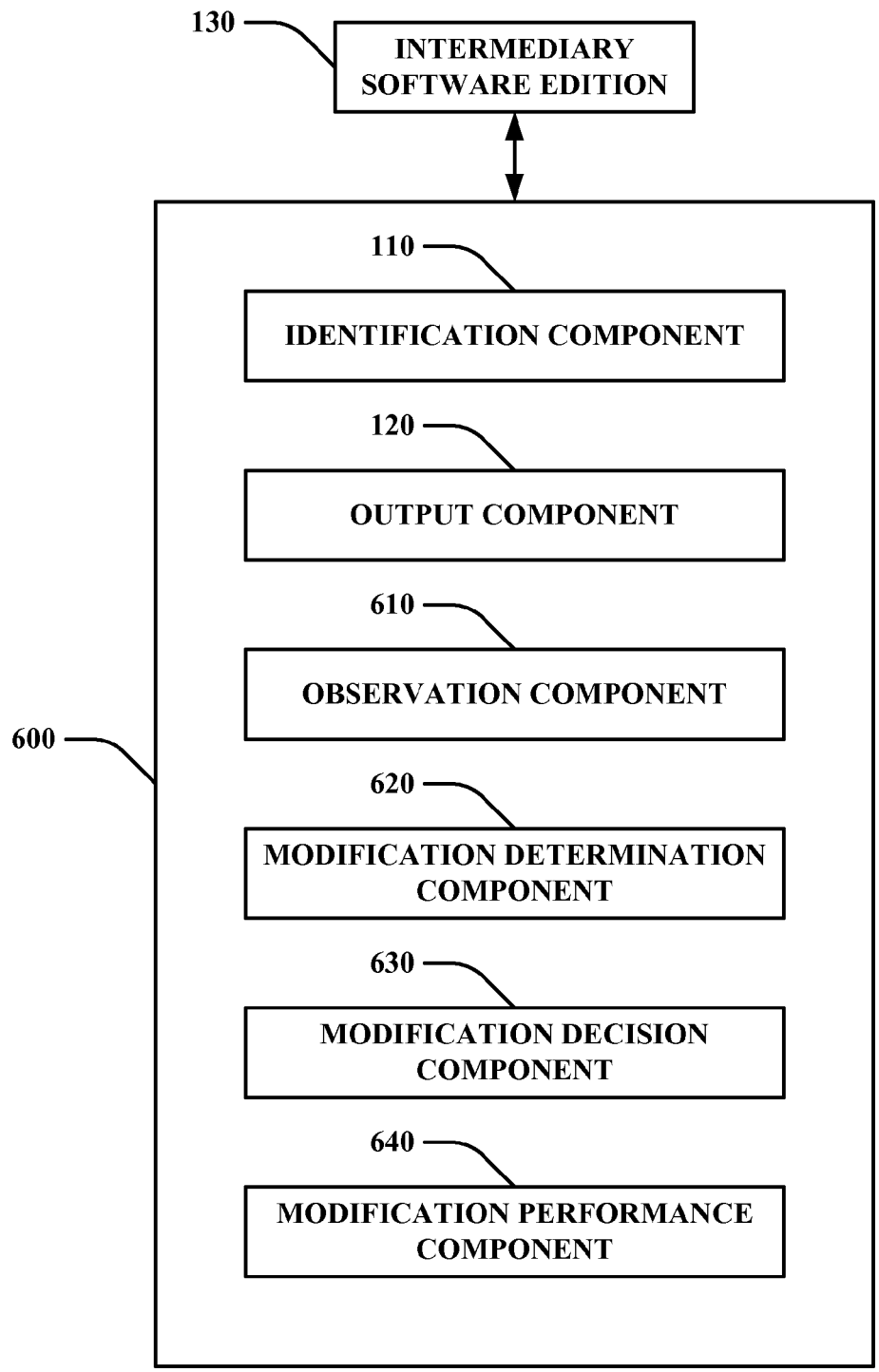
FIG. 6 illustrates one embodiment of a system with the identification component, the output component, an observation component, a modification determination component, a modification decision component, and a modification performance component.

FIG. 6 illustrates one embodiment of a system 600 with the identification component 110, the output component 120, an observation component 610, a modification determination component 620, a modification decision component 630, and a modification performance component 640. The observation component 610 can be configured to make an observation on how an entity (e.g., a user) responds to the intermediary software edition 130 (e.g., an interface) and to produce an observation result that reflects the observation. The modification determination component 620 can be configured to determine if the intermediary software edition 130 should be modified based, at least in part, on the observation result. The modification decision component 630 can be configured to determine (e.g., decide) a manner (e.g., a quickest manner, a cheapest manner, a most effective manner, etc.) on how to modify the intermediary software edition 130 based, at least in part, on the observation result. The modification decision component 630 can operate in response to the modification determination component 620 determining that the intermediary software edition 130 should be modified. The modification performance component 640 can be configured to cause the intermediary software edition to be modified (e.g., perform the modification, instruct a component to perform the modification, etc.) according to the manner.

The intermediary software edition 130 can be dynamic in nature. As such, the intermediary software edition can be initially produced and then modified based on changing circumstances, new information, and others.

In one example, a user can be transitioning from a new interface to an old interface. In response to this transitioning, an intermediary interface set (e.g., one or more intermediary interfaces) can be generated and the intermediary interface set can be the intermediary software edition. For example, the intermediary interface set can comprise a first interface (e.g., more similar to the old interface than the new interface), a second interface (e.g., an interface that in about half way between the new interface and the old interface and/or about half way between the first interface and a third interface), and the third interface (e.g., more similar to the new interface than the old interface).

The user can be presented the first interface. In one example, the observation component 610 can determine that the user is not adapting well to the first interface. In response to the user not adapting well, the modification determination component 620 can indicate to the modification decision component 630 that a change should be made regarding the interfaces. The modification decision component 630 can determine that an alteration to the second interface should be made such that the second interface is more similar to the first interface, determine that a modification to the first interface should be made, determine that a fourth interface should be created to segment between the first interface and the second interface, and others. In one example, the observation component 610 can determine that the user is adapting better than expected to the first interface. The modification decision component 640 can cause implementation of how the modification decision component 630 decides to modify the interfaces. In response to the user responding better than expected, the modification determination component 620 can determine that the interfaces should be modified. The modification decision component can decide that the second interface should be skipped (e.g., transfer from the first interface to the third interface or new interface), decide that the second interface should be modified to be more similar to the third interface or new interface, decide to alter the first interface to make the first interface closer to the new interface than an initial state, and others. The modification performance component 640 can implement the decision of the modification decision component 630.

In one example, a user can be transitioning from a new interface to an old interface. In response to this transitioning, an intermediary interface can be generated and the intermediary interface can be the intermediary software edition. The observation component 610 can monitor how a user responds to the intermediary interface. Based on this monitoring, the modification determination component 620 can determine if the intermediary interface should be modified (e.g., in response to an observation that the user is struggling with the intermediary interface). In response to determining that the intermediary interface should be modified, the modification decision component 630 can determine how the intermediary interface should be modified. In one example, the modification decision component 630 can determine that another intermediary interface should be created and then create a second intermediary interface. The second intermediary interface can transition the user from the intermediary interface to the new interface, be an interface more similar to the old interface and the second intermediary interface replaces the intermediary interface (e.g., the intermediary interface can be again disclosed after the user interacts with the second intermediary interface), and others. The modification performance component 640 can perform modification as instructed by the modification decision component 640.

Figure 7:
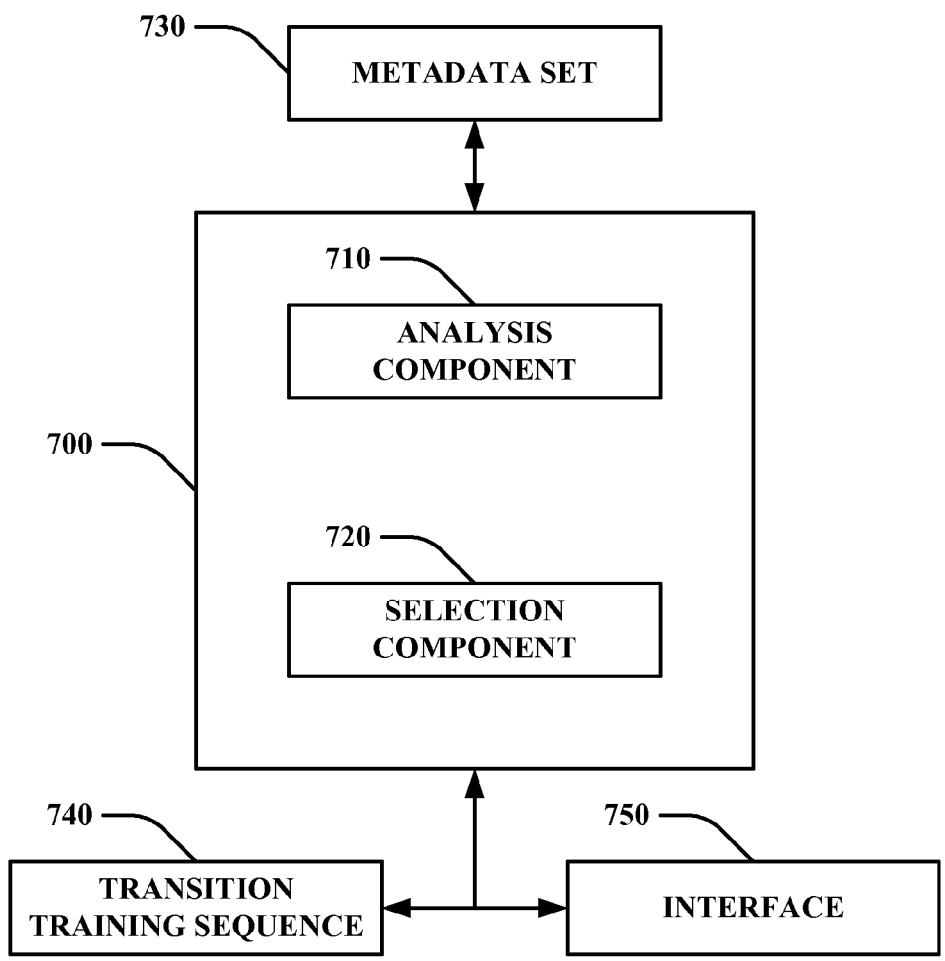
FIG. 7 illustrates one embodiment of a system with an analysis component and a selection component.

FIG. 7 illustrates one embodiment of a system 700 with an analysis component 710 and a selection component 720. The analysis component 710 can be configured to analyze a metadata set 730 to produce a metadata set analysis result. The selection component 720 can be configured to make a determination on (e.g., determine) if a transition training sequence 740 for an interface 750 should be created based, at least in part, on the metadata set analysis result In one embodiment, the interface 750 is an old interface (e.g., an interface on a device). The transition training sequence 740 can comprise a first action that transitions the old interface to an intermediary interface and a second action that transitions the intermediary interface to a new interface (e.g. directly transition the intermediary interface into the new interface, transition the intermediary interface to at least one intervening interface (e.g., interface between intermediary interface and new interface) and then transition the at least one intervening interface into the new interface, etc.). In one embodiment, the interface 750 is the new interface.

In one example, a software update can be downloaded onto a personal electronic device. The software update can make cause a slight change in the interface 750 (e.g., change justification of icon text). The analysis component 710 can evaluate the software update and produce a metadata set analysis result that indicates the slight change is inconsequential. The selection component 720 can evaluate this metadata set analysis result and determine that since the slight change is inconsequential, the transition training sequence 740 should not be created. In response to this determination, the software update can implement the slight change on the interface 750.

Figure 8:
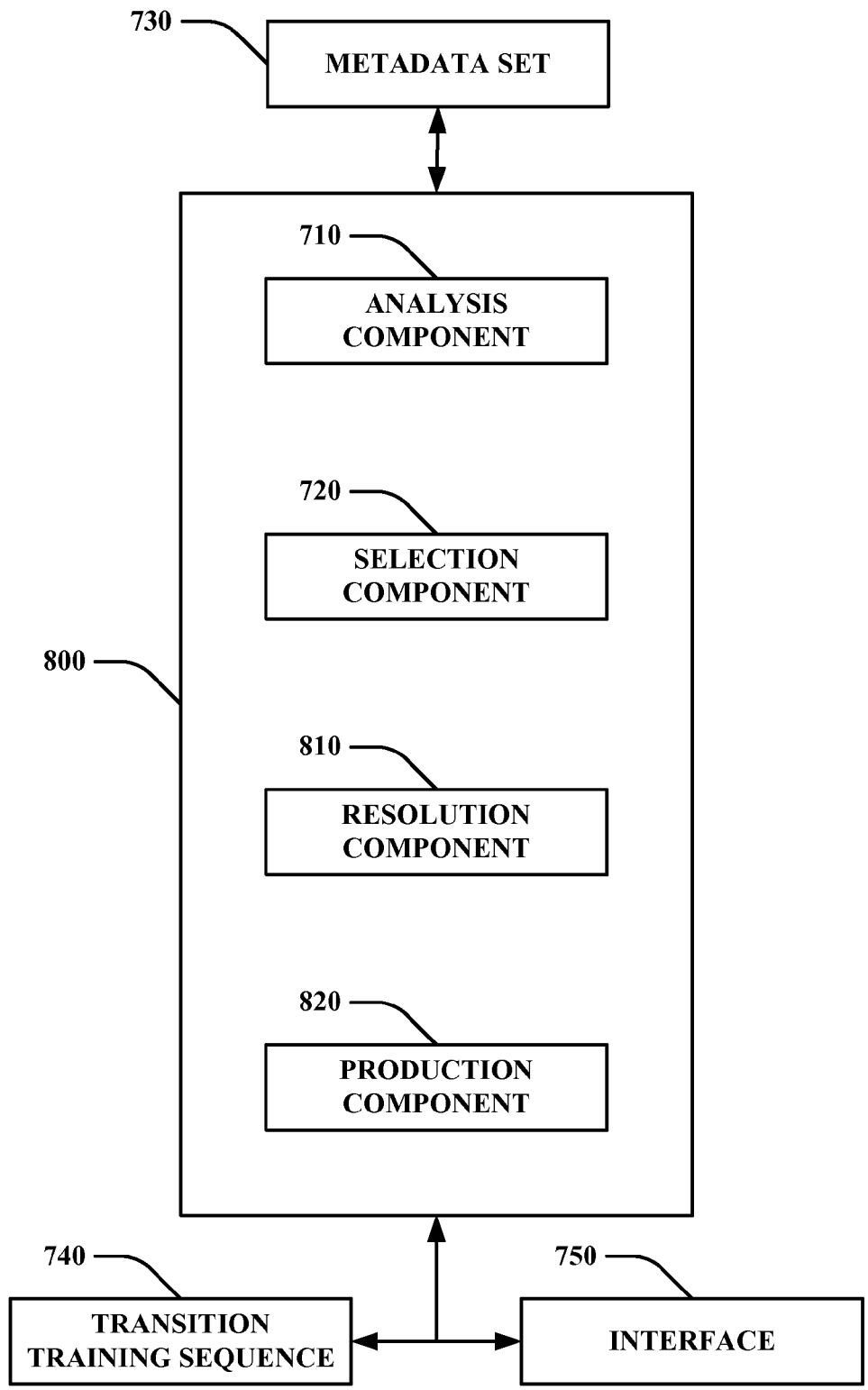
FIG. 8 illustrates one embodiment of a system with an analysis component, a selection component, a resolution component, and a production component.

FIG. 8 illustrates one embodiment of a system 800 with an analysis component 710, a selection component 720, a resolution component 810, and a production component 820. The resolution component 810 can be configured to decide a content of the transition training sequence 750 based, at least in part, on the metadata set analysis result. The resolution component 810 operates in response to the determination from the selection component 720 being that the transition training sequence 740 should be created for the interface 750. The production component 820 can be configured to create the transition training sequence with the content decided by the resolution component 810.

In one embodiment, the interface 750 is an old interface. The transition training sequence 740 can comprise a first action that transitions the old interface to an intermediary interface and a second action that transitions the intermediary interface to a new interface. The transition training sequence 740 can be configured to train an entity (e.g., a user) to use the new interface, where the entity previously used the old interface. For example, a user can use a first word processing program on a first personal computer. The user can purchase a second personal computer with a second word processing program already loaded on the second personal computer. The first word processing program can run a different interface from the second word processing program. The analysis component 710 can evaluate the first word processing program and second word processing program (e.g., the first word processing program and second word processing program are part of a metadata set) and provide a result (e.g., metadata set analysis result) from this evaluation to the selection component 720. The selection component 720 can determine if the transitioning training sequence should be created based on this result. In one example, if a new feature set (e.g., one or more new features) are included in the second word processing program that are not included in the first word processing program, then the selection component 720 can draw an inference (e.g., by using at least one artificial intelligence technique) that the transition training sequence 740 should be created.

In response to the selection component 720 determining that the transition training sequence 740 should be produced (e.g., in response to receiving a signal from the selection component 720 indicating this), the resolution component 810 can determine the content for the transition training sequence. In one embodiment, the resolution component 810 can evaluate the metadata set analysis result to determine the content. The metadata set analysis result can comprise a comparison between an old interface (e.g., an interface of the first word processing program and new interface (e.g., an interface of the new word processing program). For example, analysis of the old interface against the new interface and/or analysis of the new interface against the old interface can take place. Based on this comparison, the resolution component 810 can decide how many intermediary interfaces to use, what the content of the intermediary interface(s) should be, for how long and/or how many times an individual interface should be presented, and others. The metadata set analysis result (e.g., along with the comparison) can include (but is not limited to) an analysis of an entity profile of the entity (e.g., user profile of the user, demographic information of a user, etc.) and/or an analysis result of analysis of a historical profile (e.g., of the user, of other users, etc.). For example, the user can have previously switched word processing programs. Based on how the user responded to the previous switch (e.g., recoded in a historical profile of the user) and/or how comfortable the user is in using a word processing program (e.g., user profile), the resolution component 810 can determine content of the transition training sequence 740. The production component 820 can create the transition training sequence 740 in a manner consistent with decisions made by the resolution component 810.

In one embodiment, creation of transition training sequence 740 by the production component 820 can include adapting an existing transition training sequence for use (e.g., creating an instance of the existing transition training sequence). In returning to the above example with the first and second word processing programs on the personal computers, a second user can have previously owned a unit of the first personal computer with the first word processing program and changed to a unit of the second personal computer with the second word processing program. A system related to the second user can have created a second user transition training sequence. The production component 820 can identify the second user transition training sequence. The production component 820 download the second user training sequence, which can become the transition training sequence 740 (e.g., downloading the second user training sequence and causing the second user training interface to become the transition training sequence 740 can be creating the transition training sequence 740).

In one embodiment, the selection component 720 can determine that the transition training sequence should be created. The production component 820 can cause the second user training sequence to be downloaded. The resolution component 810 can evaluate the second user training sequence and determine if the second user training sequence should be used as the transition training sequence 740, determine if a modified version of the second user training sequence should be used as the transition training sequence 740 (e.g., modifications made by the production component 820 as part of the creation of the transition training sequence 740), and others. The production component 820 can create the transition training sequence 740 and can cause the transition training sequence 740 to be used (e.g., to be displayed).

Figure 9:
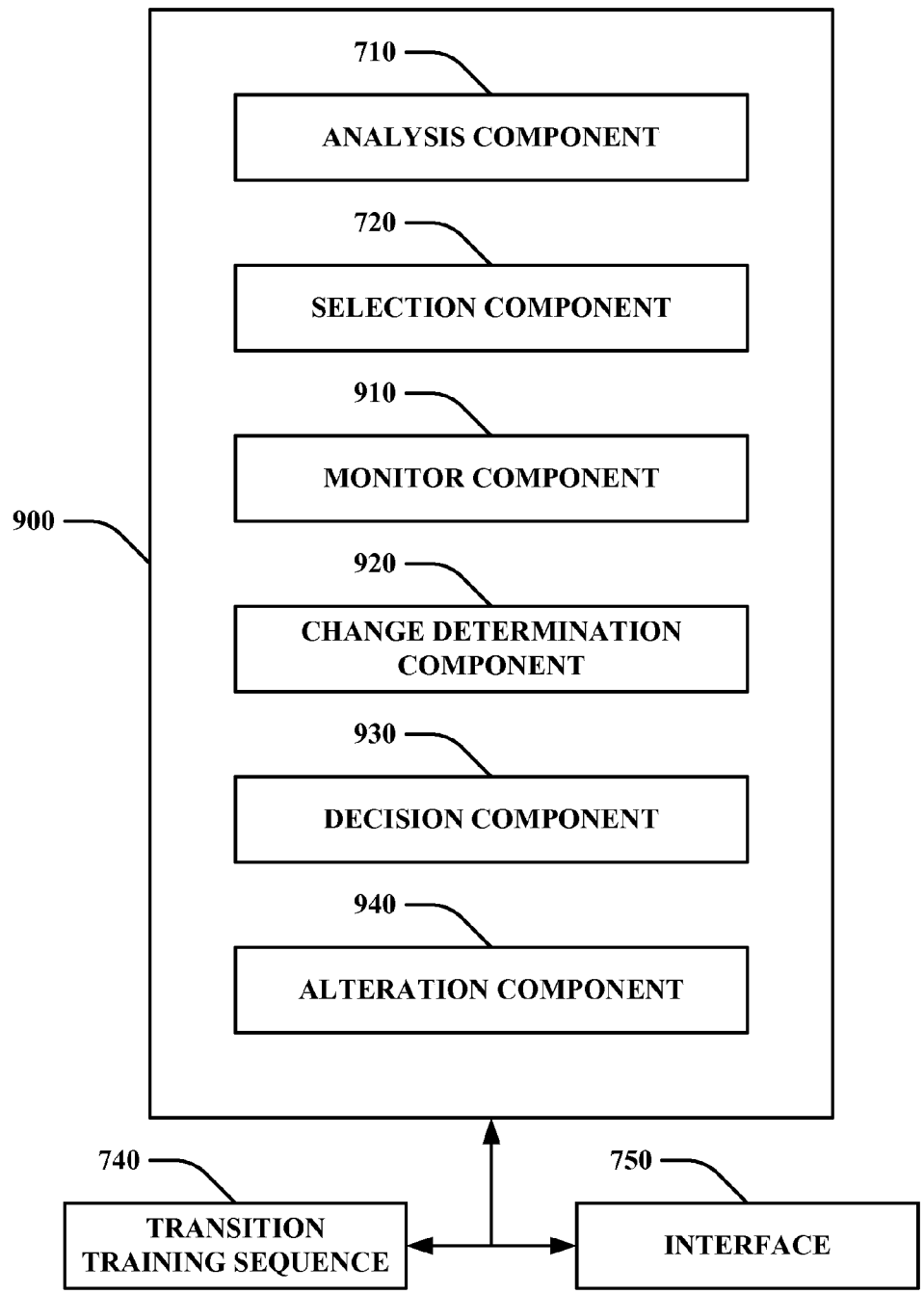
FIG. 9 illustrates one embodiment of a system that includes the analysis component, the selection component, a monitor component, a change determination component, a decision component, and an alteration component.

FIG. 9 illustrates one embodiment of a system 900 that includes the analysis component 710, the selection component 720, a monitor component 910, a change determination component 920, a decision component 930, and an alteration component 940. The monitor component 910 can be configured to monitor implementation of the transition training sequence 740 to create a monitor result. The change determination component 920 can be configured to make a change determination (e.g., based, at least in part, on the monitoring result) on if the transition training sequence 740 should change after implementation of at least part of the transition training sequence 740. The decision component 930 can be configured to make an alteration determination (e.g., based, at least in part, on the monitoring result) on how to change the transition training sequence 740. The decision component 930 can operate in response to the change determination being that the transition training sequence 740 should change. The alteration component 940 can be configured to cause the transition training sequence 740 to be altered according to the alteration determination.

In one embodiment, the transition training sequence 740 can be a series of transition interfaces that train a user to use a new interface (e.g., the interface 750), such as from using an old interface or from scratch (e.g., training a user to use an interface associated with a new program). As the user goes through transitioning training sequence 740 (e.g., uses a first transition interface), information can be gathered by the monitor component 910. For example, the monitor component 910 can observe the user is responding well to one part of the transition training sequence 740 (e.g., able to find a first group of commands easily), but is responding poorly to another part of the transition training sequence 740 (e.g., difficulty finding a second group of commands). The change determination component 920 can determine that the transition training sequence 740 should be changed and the decision component 930 can determine how the transition training sequence 740 should change. In one example, the decision component 930 can determine that in a second transition interface of the transition training sequence 740, more focus can be given to the second group of commands and less focus can be given to the first group of commands (e.g., the second group of commands receive an incremental change while the first group of commands receive a substantial change). The alteration component 940 can cause a change of focus to occur.

Figure 10:
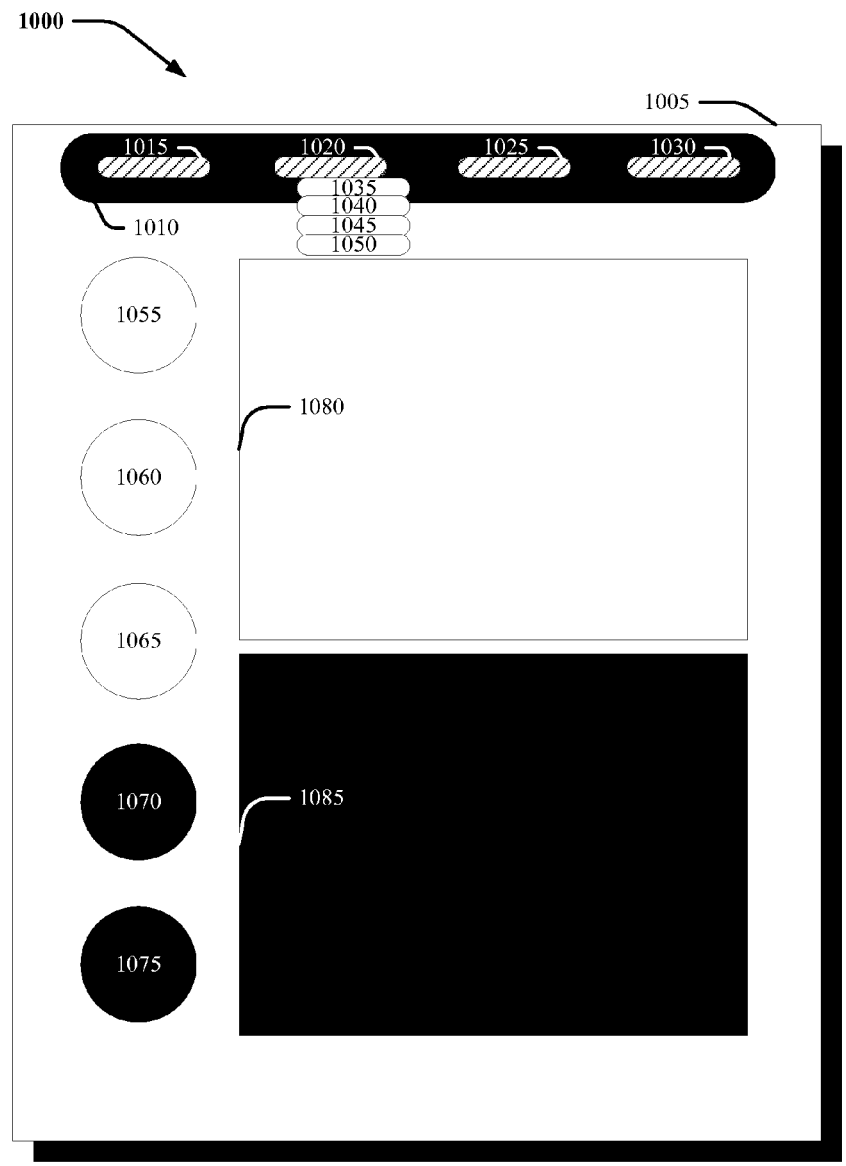
FIG. 10 illustrates one embodiment of a system with an interface.
Figure 11:
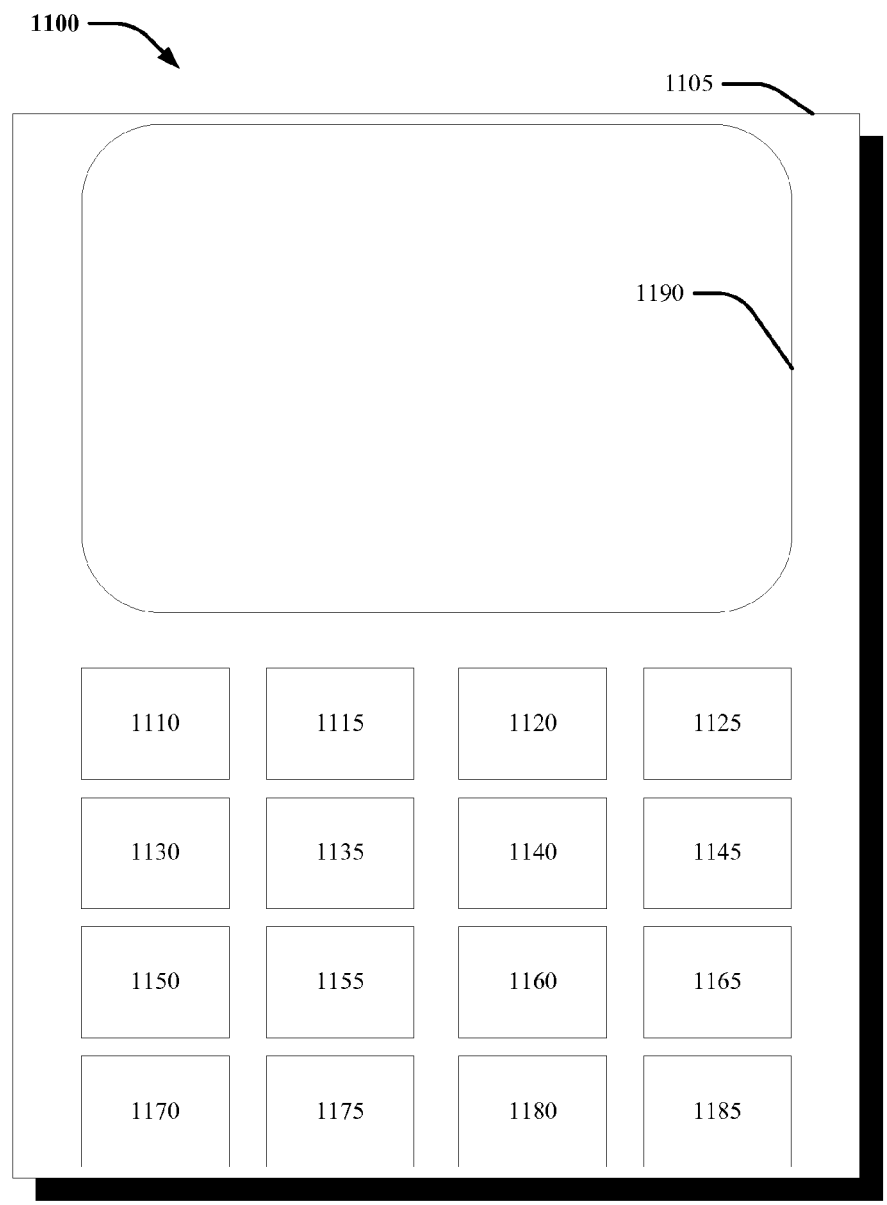
FIG. 11 illustrates one embodiment of a system with an interface.

FIG. 10 illustrates one embodiment of a system 1000 with an interface 1005 and FIG. 11 illustrates one embodiment of a system 1100 with an interface 1105. The interface 1005 can, in one embodiment, represent a current interface (e.g., an interface on a user's electronic device), which can be transitioned, merged, transformed or replaced by the interface 1105 (e.g., a different interface from the interface 1005, such as different visuals, different commands associated with matching visuals, and others). The interfaces 1005 and 1105 can include hardware elements, software elements, a combination of hardware and software elements, and others. While the interfaces 1005 and 1105 (and other interfaces disclosed herein) illustrate interfaces as a two-dimensional series of elements in a single unified interface, it is to be appreciated by one of ordinary skill in the art that interface elements can be distributed in a variety of placements, and these depictions do not limit the scope to include or exclude possible combinations.

The systems 1000 and 1100 can be one or a plurality of systems. For example, a single notebook computer can run multiple programs (e.g., where the systems 1000 and 1100 are part of the multiple programs) and these programs can be associated with various interfaces. In another example, a plurality of aircraft can utilize different heads-up displays (e.g., where the displays function as interfaces (e.g., interfaces 1005 and 1105), where interfaces are presented that are associated with individual heads-up displays, and others).

Interface 1100 includes aesthetic geometry 1010. Aesthetic geometry 1010 can serve a function, such as allowing the user to appreciate particular design features, be purely a matter of form, a combination of function and form, and others. Multiple facets of aesthetic geometry (or other visual features) can be employed in interface 1005 (or another interface).

Interface aspects 1015, 1020, 1025, and 1030 are oriented within aesthetic geometry 1010. In one embodiment, interface aspects 1015-1030 are drop-down menus. A drop down menu can include a variety of options or menu selections. For example, drop-down menu 1020 can include menu selections 1035, 1040, 1045, and 1050. Alternatively, drop down menu 1020 can serve other functions. Example other features of the interface aspects 1015-1030 can include static and dynamic features, hardware, and software, can be conceived to be represented in this or other ways.

Interface 1005 can also include elements 1055, 1060, 1065, 1070, and 1075. These elements can be items included in an interface (e.g., the interface 1005). In one embodiment, element 1055 can be a display aspect such as a gage, indicator, alarm, counter, et cetera. In one embodiment, element 1055 can be an interactive element such as a button, dial, knob, radio selector, menu, et cetera. These descriptions are not meant to describe just element 1055, but also elements among elements 1055-1075 (or others not shown). Further, while shown in this manner for simplicity of description, elements 1055-1075 may not be included in an example interface 1100, or similar portions of interface 1100.

Interface 1100 can also include display areas 1080 and 1085. Display areas 1080 and 1085 can include active (e.g. interactive) features that the user can control or augment during use, such as text boxes, rulers, margins, editing features, and so forth. Display areas 1080 and 1085 can include passive (e.g. non-interactive) features that the user does not actively work with using one or more controls (e.g., a static text disclosure). In one embodiment, the user can modify (e.g., add, delete, change functionality, change size, etc.) elements 1055-1075, interface aspects 1015-1030 (e.g., including selections 1035-1050), display areas 1080 and 1085, or a combination thereof. A display (e.g., monitor or screen) can comprise a component of a display pertinent to the aspects described herein—in this way the display could render some features of the interface 1005 and/or be a feature of the interface 1005 in and of itself. In one embodiment, the display can refer to a physical device (e.g., computer monitor, television, etc.) and/or part of a device (e.g., a touch screen of a smart phone).

Now referring to FIG. 11, interface 1005 includes an array of components 1110, 1115, 1120, 1125, 1130, 1135, 1140, 1145, 1150, 1155, 1160, 1165, 1170, 1175, 1180, and 1185. As with the elements of interface 1100, components 1110-1085 arranged in a manner for ease of description, and can represent or take the form of various constituent aspects capable of being included in an interface (e.g., the interface 1105). Further, components 1110-1185 can be asymmetrical, of similar design, of similar function, or related in other manners.

Interface 1105 further includes primary display 1190. Primary display 1190 can be shaped, sized, placed, split or arranged various ways. In one embodiment, primary display 1190 can be tabbed, cascaded, or stacked to allow multiple displays in the same area, simultaneously or at different times. Primary display 1190 can include active (e.g. engaging user or employing interaction) or passive elements (e.g. performs similarly whether user engaged or not), or a combination thereof. Primary display 1190 may be something other than a display element, but for illustrative purposes, the primary display 1190 is discussed as a display element herein.

An aspect detailed above can potentially be one or more constituent aspects of an interface (e.g., the interface 1105). For example, the component 1115 can be a constituent aspect (e.g., constituent element) of the interface 1105 (e.g., a button that when engaged performs a function). The term "constituent aspect" can be employed as generalized language to capture the breadth of possible features included in an interface (e.g., the interface 1105). Interfaces, and the systems they interact with, can include various features of hardware or software. Even functionally identical interfaces can employ different appearances (e.g. names, languages, arrangement, color scheme, or other aspects); and interfaces of identical appearance can have different functionality (e.g., two interfaces can have matching buttons, a button on the first interface can cause a print command while a matching button on the second interface can cause a scan command).

Further, some constituent aspects of interfaces are not conducive to static diagramming. For example, tooltips, zooming, popups, selection, right-click options, and alternative displays or controls may be visible, accessible or otherwise relevant in very specific instances of system use. Further, a single control or action may produce different results depending on what portion of the interface is in use, what means of control is employed, or a virtually infinite number of other variables relating to the instant system (or other). While these constituent aspects are not necessarily included in the figures for purposes of simplicity, they are by no means excluded and are easily realized and employed by the features described herein.

In addition, while ease of description lends itself to details relating to computerized, software or electro-mechanical interfaces and controls, this is in no way meant to limit the applicability of the features herein. For example, an interface could be a wholly dynamic web entity, incorporating a variety of multimedia, feeds, and others. Design changes and updating aspects can be included. Alternatively, interfaces can exist in developing or nontraditional environments. While the display-centric details in this application appear directed to digital systems, particularly utilizing interactive displays, an interface may take on a predominantly analog arrangement, using analog controls displays including fixed gages, meters, scopes, et cetera, that are transitioned such that hardware components and/or physical controls are switched or augmented in a way to assist with transitions of physical aspects. The systems and methods disclosed within this document can be adapted to or employed with a potentially unlimited series of control, display or interface capable of being rendered or modified, regardless of their composition or constituent aspects.

It is readily appreciable that FIG. 1 and FIG. 2 are different in many ways. While the visual aspects are emphasized for purposes of relating the description to diagrams, possibilities exist as to the dissimilarities in form and function between interfaces 1005 and 1105 (or between other interfaces). Despite this, the interfaces can be transitioned (or combined, morphed, integrated, et cetera) to assume a combination of forms and functions included in either interface. Alternatively, one or both interfaces could take on entirely new form and function, or a plurality of interfaces (e.g. more than two) can be mixed-and-matched to suit user preferences, or particular learning, efficiency or taste goals. In one embodiment, the creation component 320 of FIG. 3 can produce a first icon and a second icon. The first icon can be a pre-transition icon and the second icon can be a post-transition icon. The analysis component 710 of FIG. 7 can evaluate the first icon and second icon to produce an analysis result. This evaluation can include scanning the icons, analyzing code used to represent the icons, and others. Based on the analysis result, a transformation component (e.g., the output component 120) can create a third icon (e.g., the intermediary software edition 130 and/or transition training sequence 740) that functions as an intermediary between the first icon and second icon. A determination component (e.g., the modification decision component 630) can determine when to cause display of the third icon. A transition component (e.g., the output component 120) can cause the third icon to display after presentment (e.g., to a user) of the first icon but before presentment (e.g., to the user) of the second icon.

Figure 12:
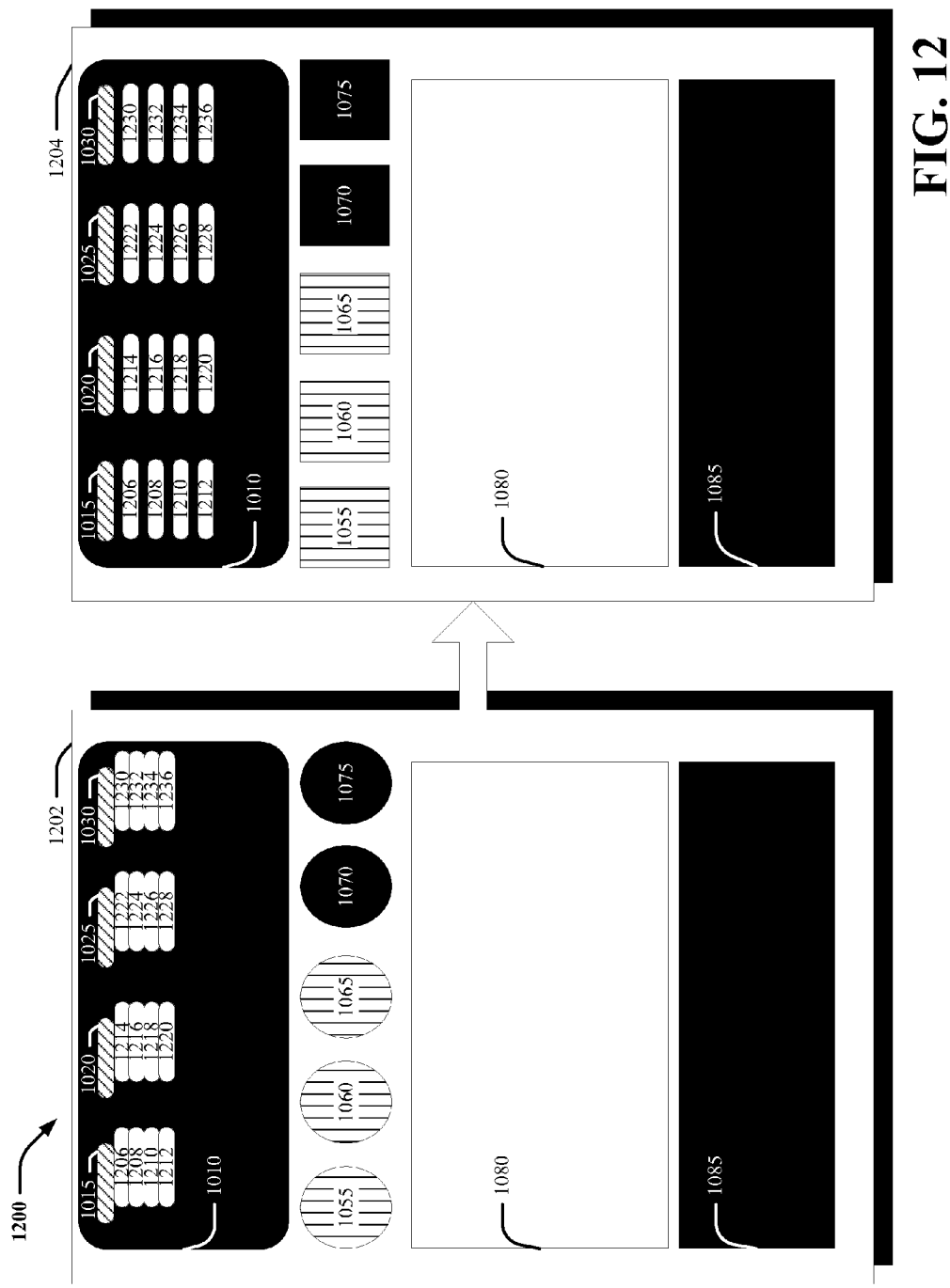
FIG. 12 illustrates one embodiment of a system with a first interface and a second interface.
Figure 13:
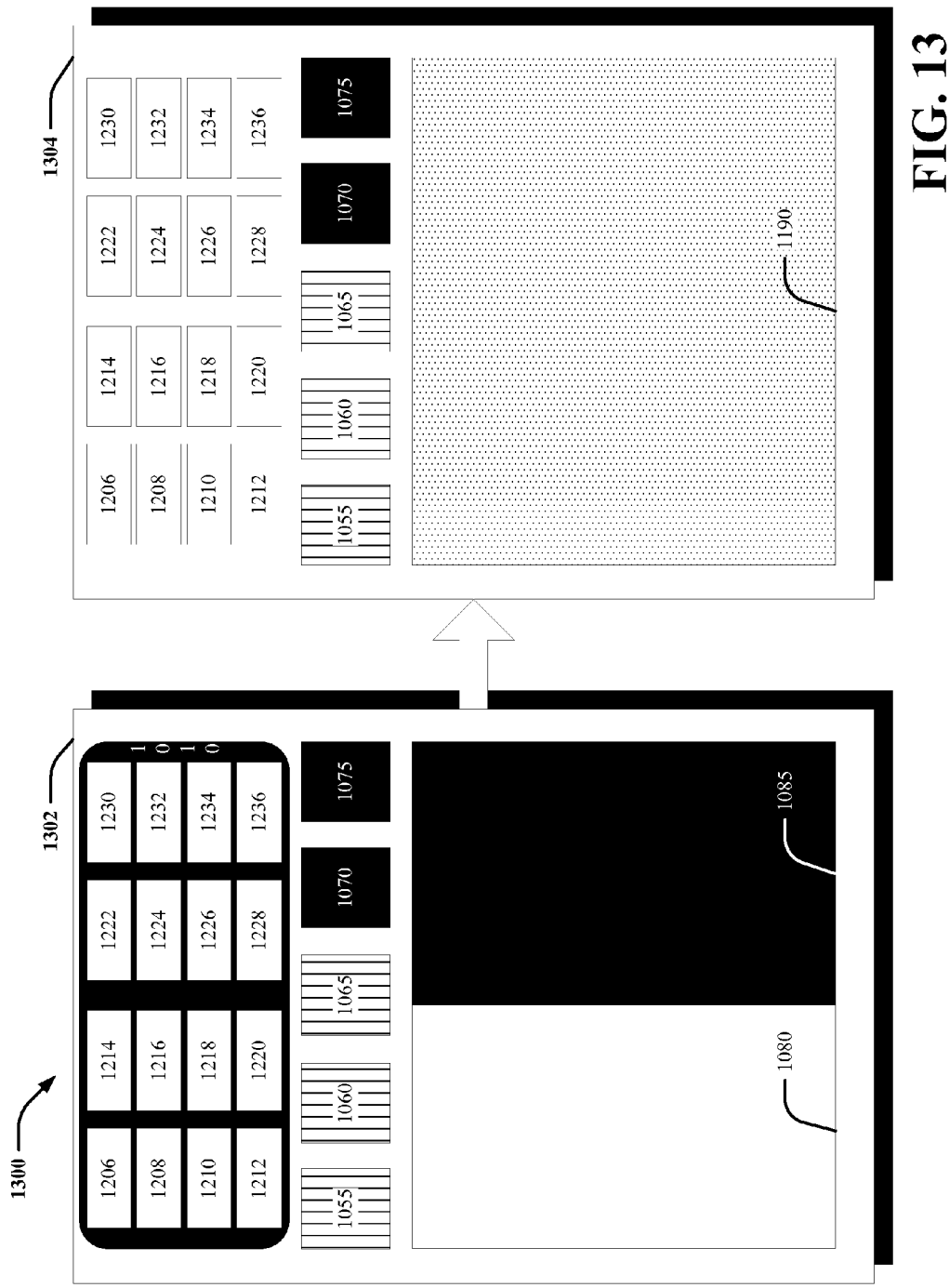
FIG. 13 illustrates one embodiment of a system with a first interface and a second interface.
Figure 14:
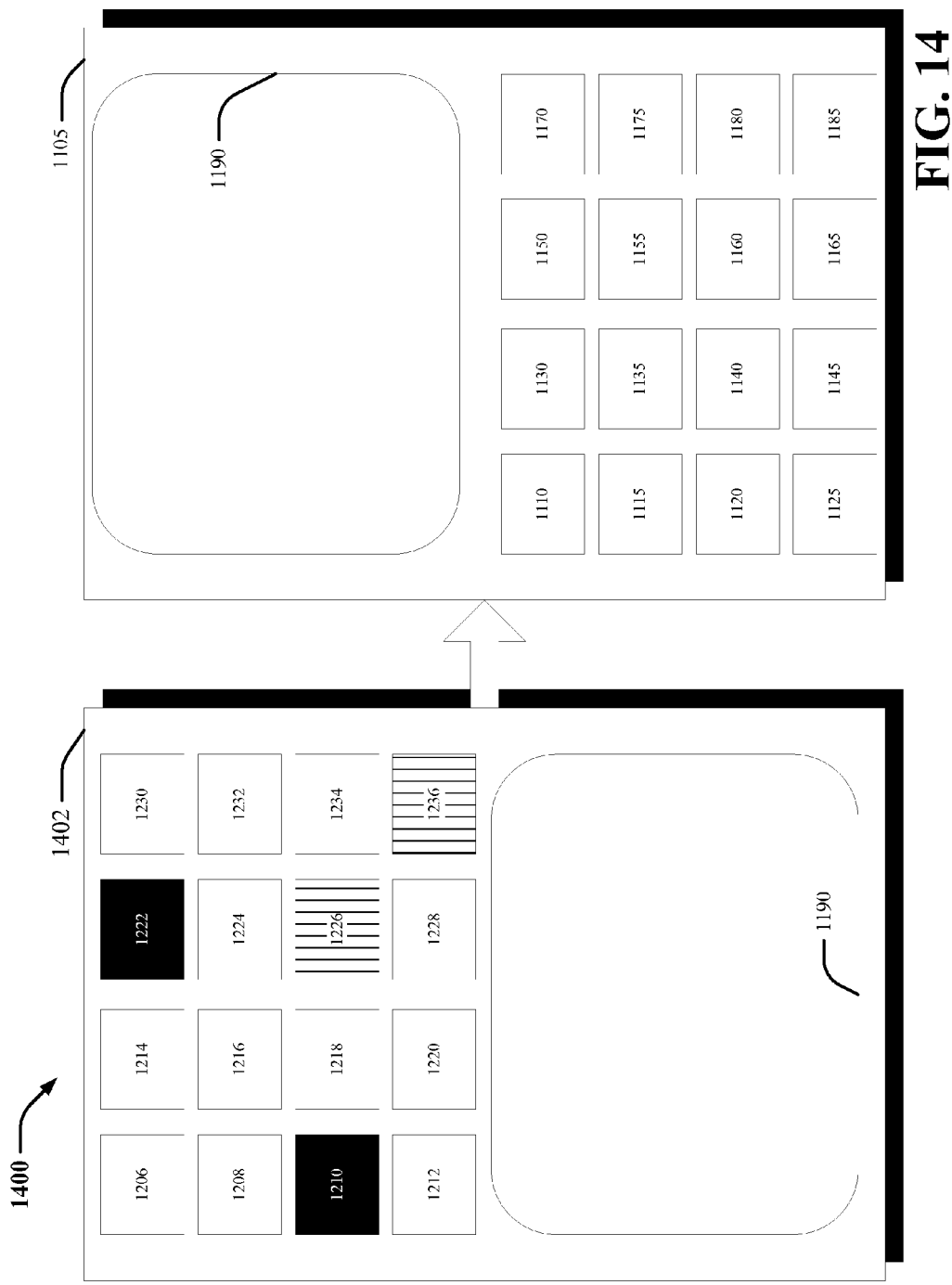
FIG. 14 illustrates one embodiment of a system with two interfaces.

FIG. 12 illustrates one embodiment of a system 1200 with a first interface 1202 and a second interface 1204. FIG. 13 illustrates one embodiment of a system 1300 with a first interface 1302 and a second interface 1304. FIG. 14 illustrates one embodiment of a system 1400 with an interface 1402 and the interface 1105. The interfaces 1202, 1204, 1302, 1304, and 1402 can be used to transition from interface 1005 to interface 1105 (e.g., interfaces 1202, 1204, 1302, 1304, and 1402 can be part of the intermediary software edition of FIG. 1, interface 1005 can be the old software edition 150 of FIG. 1, and interface 1105 can be the new software edition 140 of FIG. 1). Interfaces 1202, 1204, 1302, 1304, and 1402 can represent various stages of transitioning between an old interface (e.g., interface 1005 of FIG. 10) and a new interface (e.g., interface 1105) and to show simple illustrative examples of the transitioning process. It is to be appreciated by one of ordinary skill in the art that the terms 'old interface' and 'new interface' do not necessarily relate to being old or new to a user, but instead are used for distinguishing proposes. For example, a 'new interface' may not be new to a user, but may simply be an interface being transitioned to.

Specific interfaces, transitioning steps, final result, and so forth are illustrative examples, and are not to be considered essential to transitioning from one or more first interfaces to one or more second interfaces, as is described herein. Rather, other suitable examples that would be within the purview of one of ordinary skill in technical arts related to the subject disclosure, or that would be made known to one of ordinary skill by way of the context provided herein, are considered within the scope of the disclosure.

For example, while FIGS. 12-14 show an example transition from interface 1005 to interface 1105, one embodiment may not accomplish the example transition, but instead persist a hybrid between the figures. In one embodiment, interface 1005 could be transitioned to interface 1202. FIGS. 12-14 show a largely linear process, but this step-by-step, single-direction model is by no means obligatory. For example, portions of a transition at any given point could be reverted, or automatically changed back in a following point (e.g., as performed by the rollback component 210 of FIG. 2). In this way, a given pattern of changes could be adopted. It is also unnecessary to view a transition as a stepwise process, as timing, relevant elements or components, and process can be wholly fluid and need not conform to any discernible structure or schedule. Furthermore, the figures disclosed herein and accompanying description, are used for advisory purposes, and are in no way intended to limit the types of elements, components, structures, systems, interfaces, or any other constituent aspect in their according use. Likewise, the transitions or changes shown between such are by no means intended as exclusive, and possibilities exist regarding the accomplishment of transitioning to, between or from a constituent aspect or aspects. In other words, the transitioning process is not merely constrained to a single path, but can be a series of exclusive and/or coexisting paths (e.g., one transitioning path can be pursued exclusive of others, or a variety of transitioning paths can be followed at once), and paths may allow "movement" in two or more directions (e.g. "move" in reverse back through completed transitions, rearrange order of transitions as compared to a similar system), and/or include variations in speed, and skip and/or add certain segments of any given path. Although a largely one-dimensional approach is illustrated in FIGS. 12-14 for ease of demonstration, in practice an n-dimensional approach may be easily implemented as appreciated by one of ordinary skill in the art.

FIG. 12 illustrates an example of some modifications to an interface (e.g., modifications to the interface 1005 represented in interface 1202) possible to pursue in an embodiment of a system or method transitioning between interfaces 1005 and 1105. Changes between interface 1202 and interface 1005 can be considered noticeable. For example, aesthetic geometry 1010 in interface 1202 differs from aesthetic geometry 1010 in interface 1005 in that it has been expanded to allow for interface aspects 1015-1030 (e.g., drop down menus) to display menu selections 1206, 1208, 1210, 1212, 1214, 1216, 1218, 1220, 1222, 1224, 1226, 1228, 1230, 1232, 1234, and 1234 to remain expanded and visible at all times, while remaining in aesthetic geometry 3110. While sharing the same reference number, it is to be appreciated by one of ordinary skill in the art that aesthetic geometry 1010 in interface 1202 and aesthetic geometry 1010 in interface 1005 may or may not actually be the same geometry (e.g., geometry in 1202 may be a modification of geometry in 1005, geometry 1202 may be a replacement of geometry in 1005, etc.). In one embodiment, the menu selections 1206-1234 can be menu selections available in interface 1005 (e.g., selection 1035 is the same as selection 1214), menu selections can be altered (e.g., selection 1035 is different from selection 1214), be combinations (e.g., selection 1035 is the same as selection 1214 while selection 1035 and selection 1216 are different), be movement (e.g., selection 1035 is the same as selection 1220 and/or selection 1236), etc.

In one embodiment, a component (e.g., the monitor component 910 and/or the change determination component 920) can determine that at least part of the menu selections 1206-1236 go beyond the aesthetic geometry 1204. An artificial intelligence component (e.g., part of the system 100 and/or system 700) can infer that the menu selections 1206-1236 should not go beyond the aesthetic geometry 1204. This inference can be based, at least in part, on monitoring a user response to the menu selections 120-1236 (e.g., how long it takes a user to choose a menu selection), explicit user feedback (e.g., unprompted suggestion, survey result), and others. Based on this inference, a system (e.g., the system 100) can automatically cause the interface 1202 to transition such that menu selections fall within the aesthetic geometry 1204.

Likewise, elements 1055-1075 are re-oriented from a side vertical arrangement to a horizontal layout directly below aesthetic geometry 1204. In this way, in one embodiment, the layout of the appearance of a monitor displaying an interface can begin to more closely emulate that of interface 1105, to which interface 1005 is being transitioned.

Display elements 1080 and 1085 are also rearranged to more closely emulate the structure of interface 1105. It is understood that the geometric changes described herein can vary according to system or interface capabilities. For example, elements on the top could be oriented on the bottom, et cetera. Any desired arrangement, geometry, or structure within the possible screen real estate or other alter-able features of an interface can be pursued. In addition, movement or visual transformations to an interface may not alter features associated with the transformed aspects (e.g., a label, color or title), and it may be that at no point during a transition between interfaces does any particular aspect necessarily assume all or any particular design or functional aspect in a transition. Likewise, one or more visual aspects can remain constant while the purpose or function of such aspects undergoes transitioning. In addition, while references is made to transitioning to more closely to the new interface, it is to be appreciated by one of ordinary skill in the art that an old interface can transition further from the new interface and then transition more closely to the new interface, as well as other arrangements.

It is to be appreciated to one of ordinary skill in the art that changing of aspects, elements, selections, etc. can be a replacement, a modification, etc. For example, interface 1202 shows element 1055 as filled in a different manner than illustrated in 1055 as shown in interface 1005. This represents that element 1055 has experienced a change, but may be considered the same element. However, it is possible that element 1055 of interface 1202 may be considered a different element than element 1055 of interface 1005. This can be determined based on implementation preference, available resources, configuration, and the like.

Transitioning from interface 1202 to interface 1204 in system 1200, further changes are visible. For example, menu selections 1206-1236 are arranged symmetrically and spaced in such a way as to more closely begin to resemble the native layout of components 1110-1185 of FIG. 11. Likewise, elements 1055-1075 have taken on a squared shape, as opposed to the earlier circular shapes, in order to also more accurately emulate aspects of interface 1105. As with earlier descriptions, these variations and adjustments are not intended to be limited to purely to display or control aspects, but rather intended to illustrate simple examples of partial transitions between interfaces. Such augmentations can occur in various orders or according to various fixed schedules or plans and others.

One feature of partial interface transitioning, or a transition at a given step, can include rich indicator or multimedia features to assist users in appreciating transitions. For example, an animation could show particular aspects of an interface moving from one location to another, or changing in form (e.g., shape, color, label, et cetera). Audible alarms or notifications (including signals or memos sent to other accounts, users, applications, devices, et cetera) can be employed. Information about more subtle changes, such as the specific functionality of a control, can be described according to tutorials (e.g., written, audible, multimedia/audio-visual, other passive or interactive means), popups, tooltips, demonstrative animations or videos, help files, and other means of conveying information to users.

Data about transitions can be provided to a single user or a group of users. For example, several users might experience a transition between interfaces together. Alternatively, a maintenance specialist or system administrator can be kept informed regarding transitions occurring on machines or devices under their observation. Such data can be provided locally, remotely, or combinations thereof, and can utilize various communication means available to the relevant systems (e.g. direct connections, wired or wireless networks, the Internet or intranets, Bluetooth, infrared, telephone, radio, et cetera).

Now referring to FIG. 13, a system 1300 illustrates two further or alternative iterations for transitioning interface 1005 toward interface 1105—interfaces 1302 and 1304. Interface 1302 shows another action toward synchronizing the arrangement of menu selections 1206-1236 with the arrangement of components 1110-1185 of FIG. 11. Drop down menus 1015-1030 are no longer visible, and menu selections 1206-1236 have taken on a layout and structure closer to that of interface 1105. Aesthetic geometry 1010 is retained (e.g., to reinforce user familiarity with a former structure). Likewise, display areas 1080 and 1085 are rearranged into a more singular display to provide users with a gradual change toward the single primary display 1190 of interface 1105.

System 1300 can then transition interface 1302 to interface 1304. At this point, aesthetic geometry 1010 can be removed, as the user has encountered several transitions (or partial transitions) that allows the user to become familiar with the new arrangement of menu selections 1206-1230. In addition, display areas 1080 and 1085 have been combined into the primary display 1190. The primary display 1190 can be a combination (e.g., total combination, combination of at least some aspects, combination of aspects and other aspects (e.g., not of display areas 1080 and 1085), etc.) of display elements 1080 and 1085, or a wholly different option designed to assist with transitioning from multiple display areas to the primary display 1190 of interface 1304.

Now referring to FIG. 14, interface 1402 is shown transitioning to interface 1105 (the same interface in FIG. 11). Interface 1402 shows differences from interface 1304 in that menu selections 1206-1236 are squares and emulate elements 1055-1075. Additionally, elements 1055-1075 are removed and primary display 1190 is modified. Interface 1105 is different from interface 1402 in that menu selections 1206-1236 are flipped with the primary display 1190 and at least some menu selections 1206-1236 are changed (e.g., fill of selection 1236). It is to be appreciated by one of ordinary skill in the art that while FIGS. 10-14 and associated text are used to describe a visual transition, transitioning as disclosed herein can be functional transitioning, and others.

Figure 15:
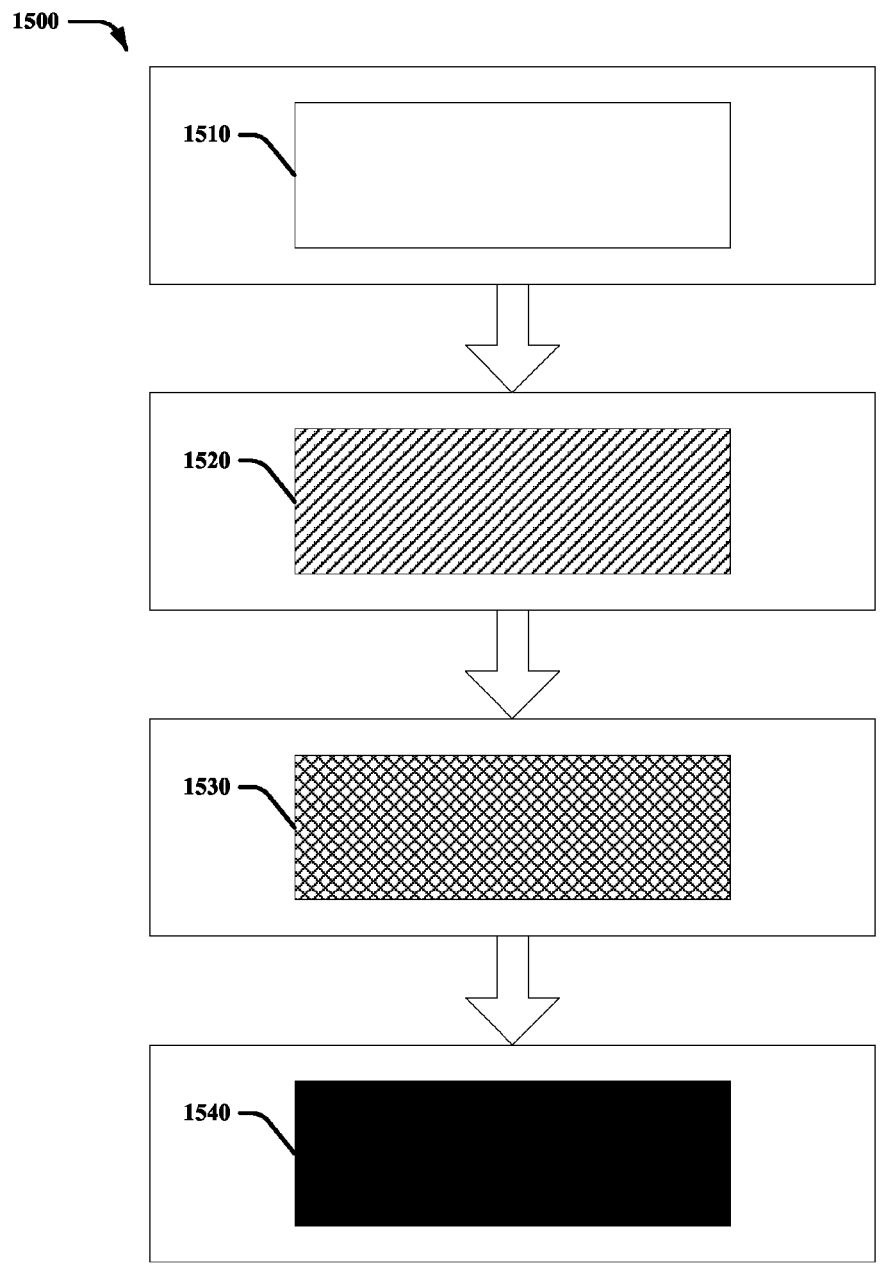
FIG. 15 illustrates one embodiment of an environment where transitioning of a single element occurs.

FIG. 15 illustrates one embodiment of an environment 1500 where transitioning of a single element occurs. The environment 1500 includes a series of transitions (or, a series of sections of a single transition). The environment 1500 be a single element transition where four different element states are shown: 1510, 1520, 1530, and 1540. Element state 1510 is initially shown with particular aesthetic features, different from those of element state 1540. Various function, or amalgamations between aesthetics and function, can be assumed, associated, moved, removed or dissociated before, during or after transitioning. Element state 1520 shows a state that can be considered between state 1510 and state 1540 exhibiting characteristics of both. For purposes of this illustration, element state 1520 shares more in common with element state 1510 than 1540. However, element state 1530 can be shown to be significantly closer in depiction to element state 1540 than element state 1510, indicating another transition (or portion of transition) toward the eventual final state shown in element state 1540. Finally, element state 1540 shows the end state at which the transition is completed from element state 1510.

The following methodologies are described with reference to figures depicting the methodologies as a series of blocks. These methodologies may be referred to as methods, processes, and others. While shown as a series of blocks, it is to be appreciated that the blocks can occur in different orders and/or concurrently with other blocks. Additionally, blocks may not be required to perform a methodology. For example, if an example methodology shows blocks 1, 2, 3, and 4, it may be possible for the methodology to function with blocks 1-2-4, 1-2, 3-1-4, 2, 1-2-3-4, and others. Blocks may be wholly omitted, re-ordered, repeated or appear in combinations not depicted. Individual blocks or groups of blocks may additionally be combined or separated into multiple components. Furthermore, additional and/or alternative methodologies can employ additional, not illustrated blocks, or supplemental blocks not pictured can be employed in some models or diagrams without deviating from the spirit of the features. In addition, at least a portion of the methodologies described herein may be practiced on a computer-readable medium storing computer-executable instructions that when executed by a computer cause the computer to perform a methodology.

Figure 16:
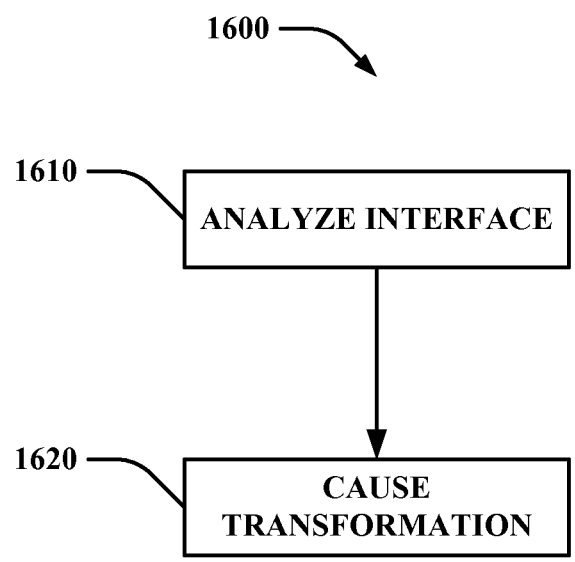
FIG. 16 illustrates one embodiment of a method that includes analyzing an interface and causing a transformation.

FIG. 16 illustrates one embodiment of a method 1600 that includes analyzing an interface and causing a transformation. At 1610, the method 1600 comprises analyzing at least one interface to produce an interface analysis result. At 1620, the method 1600 comprises causing a transformation of at least one constituent element (e.g., constituent element of the interface) based, at least in part, on the interface analysis result. In one embodiment, the transformation forwards use of a subsequent interface over use of a previous interface and the at least one constituent element is part of the at least one interface.

In one example, a first user can have an update occur where a first element of a first interface experiences a first change. The first change can be analyzed and based, at least in part, on this analysis the interface analysis result can be produced.

In one embodiment, a second element of the first interface can be designated for a change (e.g., a transformation of the second element). For example, a first icon of an interface can be transformed and then a second icon can be designated for transformation. Analysis of the first change of the first element (e.g., first icon) can be used in causing transformation of the second element (e.g., second icon). For example, a determination can be made on how to transform the second element based on how the first element was transformed, a success level of the first element transformation (e.g., how well a user responds to the first element transformation), and others. The second element can be transformed according to this determination.

In one embodiment, a second interface for the first user can be designated for a change. For example, the user can have a word processing program transition interfaces (e.g., transitioning of the first interface) and then has a spreadsheet program designated for interface transitioning (e.g., the second interface). Analysis of the first change of the first element can be used in causing transformation of an element of the second interface. For example, a determination can be made on how to transform the element of the second interface based on how the first element was transformed, a success level of the first element transformation (e.g., how well a user responds to the first element transformation), and others. The element of the second interface can be transformed according to this determination.

In one embodiment, a second interface for a second user can be designated for a change. In one example, the first user can have a transitioning experience for a word processing program and the second user can run the word processing program that is designated to be transitioned. In one example, the first user can have a transitioning experience for a word processing program and the second user can run a spreadsheet program that is designated to be transitioned (e.g., word processing transitioning is used to influence spreadsheet transitioning). Analysis of the first change of the first element can be used in causing transformation of an element of the second interface for the second user. For example, a determination can be made on how to transform the element of the second interface based on how the first element was transformed, a success level of the first element transformation (e.g., how well a user responds to the first element transformation), and others. The element of the second interface can be transformed according to this determination.

In one embodiment, the first element can be designated for a second change. For example, the first element can experience the first change where the first element is moved from a first position to a second position and a second change where the first element is moved from the second position to the third position. Analysis of the first change of the first element can be used in causing transformation of an element of the second interface for the second user. For example, a determination can be made on how to transform the element of the second interface based on how the first element was transformed, a success level of the first element transformation (e.g., how well a user responds to the first element transformation), and others. The first element can be transformed with the second change according to this determination.

Figure 17:
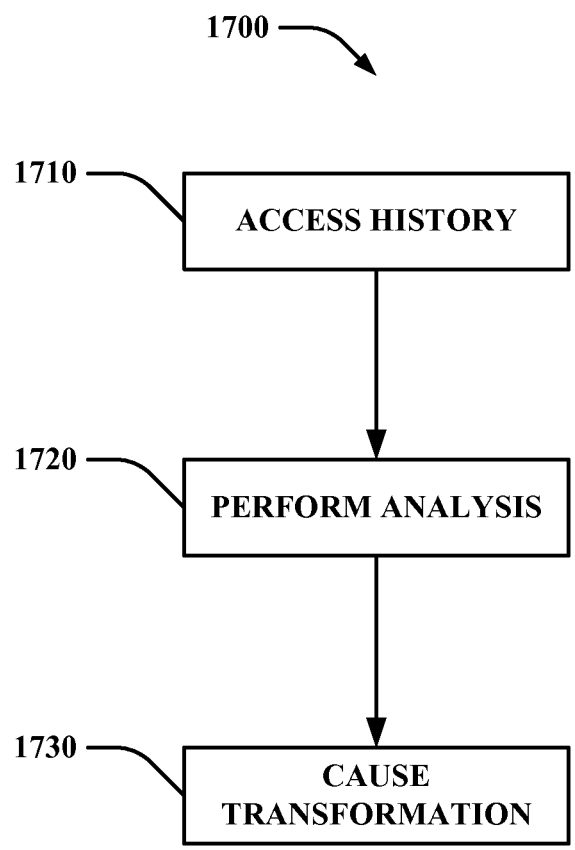
FIG. 17 illustrates one embodiment of a method that includes accessing a history, performing analysis, and causing a transformation.

FIG. 17 illustrates one embodiment of a method 1700 that includes accessing a history, performing analysis, and causing a transformation. At 1710, accessing an interface history (e.g., of the at least one interface) occurs. At 1720, analyzing the interface history to produce an interface history analysis result takes place. The interface history can comprise a history for the at least one interface and/or a history for a first rendition of a base interface (e.g., the at least one interface comprises a second rendition of the base interface). In one embodiment, analyzing at least one interface to produce an interface analysis result can occur at 1720 (e.g., the interface analysis result comprises the interface history analysis result). At 1730, causing a transformation of at least one constituent element based, at least in part, on the interface analysis result can take place.

In one embodiment, the method 1700 can be used in association with transforming (e.g., changing) an interface (e.g., transforming an element of an interface). Example changes can include modifying a look of the element, modifying a location of the element, modifying a function associated with an element, and others.

In one example, a history can be accessed and analyzed. For example, the history can be of how a user has responded to previous interface transitioning experiences and/or changes in interfaces (e.g., abrupt changes without a transitioning experience), how other users (e.g., similar to the user) have previously responded to transitioning experiences, how other users have responded to transitioning of a rendition of a program designated for transitioning (e.g., a second user has the word processing program that has been transitioned, while the user has the word processing program that has not been transitioned), and others. This history can be used to determine how transitioning for the user should occur and based, at least in part, on this determination, the transitioning can occur.

Figure 18:
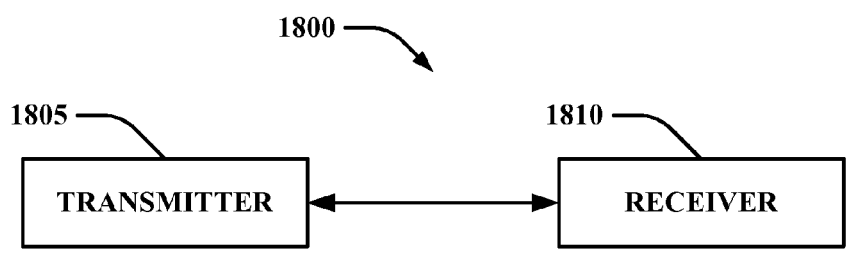
FIG. 18 illustrates one embodiment of a system that may be used in practicing at least 25 one aspect disclosed herein.

FIG. 18 illustrates one embodiment of a system 1800 that may be used in practicing at least one aspect disclosed herein. The system 1800 includes a transmitter 1805 and a receiver 1810. In one or more embodiments, the transmitter 1805 can include reception capabilities and/or the receiver 1810 can include transmission capabilities. In one embodiment, the system 100 of FIG. 1 includes the transmitter 1805 and/or the receiver 1810. In one example, the output component 120 of FIG. 1 causes the intermediary software edition 130 of FIG. 1 to be disclosed by generating and/or sending an instruction set to the transmitter 1805 to disclose the intermediary software edition 130 of FIG. 1.

The transmitter 1805 and receiver 1810 can each function as a client, a server, and others. The transmitter 1805 and receiver 1810 can each include a computer-readable medium used in operation. The computer-readable medium may include instructions that are executed by the transmitter 1805 or receiver 1810 to cause the transmitter 1805 or receiver to perform a method. The transmitter 1805 and receiver 1810 can engage in a communication with one another. This communication can over a communication medium. Example communication mediums include an intranet, an extranet, the Internet, a secured communication channel, an unsecure communication channel, radio airwaves, a hardwired channel, a wireless channel, and others. Example transmitters 1805 include a base station, a personal computer, a cellular telephone, a personal digital assistant, and others. Example receivers 1810 include a base station, a cellular telephone, personal computer, personal digital assistant, and others. The example system 1800 may function along a Local Access Network (LAN), Wide Area Network (WAN), and others. The aspects described are merely an example of network structures and intended to generally describe, rather than limit, network and/or remote applications of features described herein.

Figure 19:
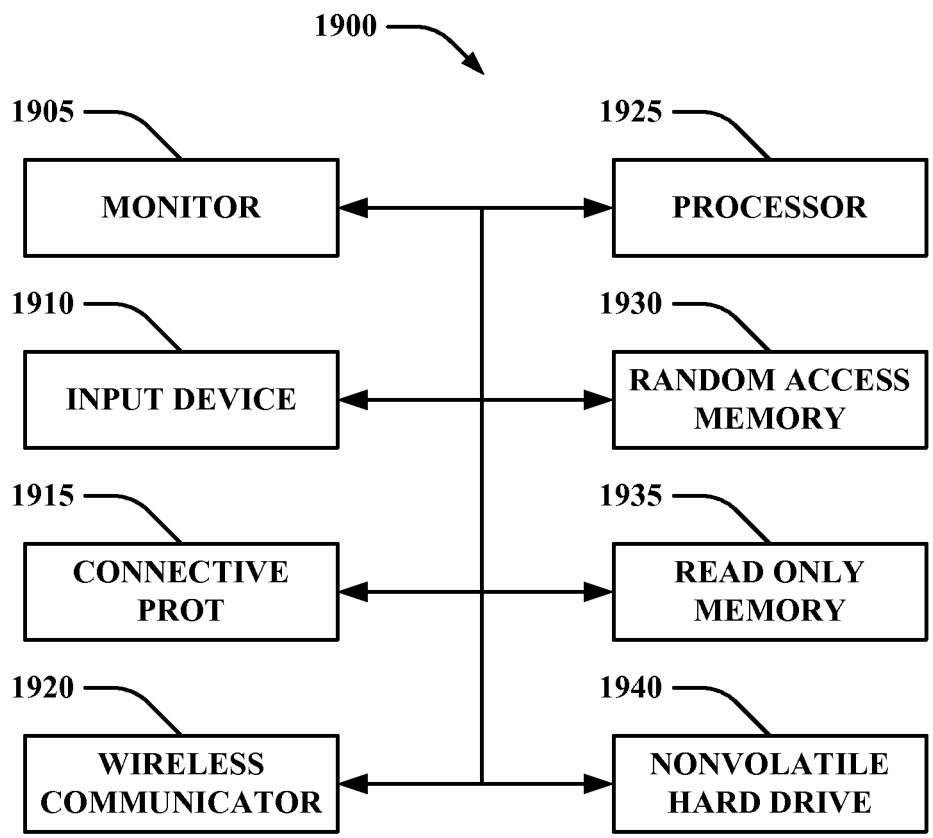
FIG. 19 illustrates one embodiment of a system, upon which at least one aspect disclosed herein can be practiced.

FIG. 19 illustrates one embodiment of a system 1900, upon which at least one aspect disclosed herein can be practiced. In one embodiment, the system 1900 can be considered a computer system that can function in a stand-alone manner as well as communicate with other devices (e.g., a central server, communicate with devices through data network (e.g., Internet) communication, etc). Information can be displayed through use of a monitor 1905 and a user can provide information through an input device 1910 (e.g., keyboard, mouse, touch screen, etc.). In one embodiment, the monitor 1905 displays interfaces disclosed herein (e.g., interface 1005 of FIG. 10). A connective port 1915 can be used to engage the system 1900 with other entities, such as a universal bus port, telephone line, attachment for external hard drive, and the like.

Additionally, a wireless communicator 1920 can be employed (e.g., that uses an antenna) to wirelessly engage the system 1900 with another device (e.g., in a secure manner with encryption, over open airwaves, and others). A processor 1925 can be used to execute applications and instructions that relate to the system 1900. In one example, the processor 1925 executes at least one instruction associated with at least one of the analysis component 710 of FIG. 7 and/or the selection component 720 of FIG. 7. Storage can be used by the system 1900. The storage can be a form of a computer-readable medium. Example storage includes random access memory 1930, read only memory 1935, or nonvolatile hard drive 1940. In one embodiment, a memory (e.g., at least one of the random access memory 1930, read only memory 1935, and/or the nonvolatile hard drive 1940) retains instructions that cause a method disclosed herein to operate. In one embodiment, the memory retains a database in accordance with at least one aspect disclosed herein.

The system 1900 may run program modules. Program modules can include routines, programs, components, data structures, logic, etc., that perform particular tasks or implement particular abstract data types. The system 1900 can function as a single-processor or multiprocessor computer system, minicomputer, mainframe computer, laptop computer, desktop computer, hand-held computing devices, microprocessor-based or programmable consumer electronics, and the like.

It is to be appreciated that aspects disclosed herein can be practiced through use of artificial intelligence techniques. In one example, a determination or inference described herein can be made through use of a Bayesian model, Markov model, statistical projection, neural networks, classifiers (e.g., linear, non-linear, etc.), using provers to analyze logical relationships, rule-based systems, or other techniques.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, innovative aspects are not limited to the specific details, the representative apparatus, and illustrative examples shown and described. Thus, this application is intended to embrace alterations, modifications, and variations that fall within the scope of the appended claims.

Functionality described as being performed by one entity (e.g., component, hardware item, and others) may be performed by other entities, and individual aspects can be performed by a plurality of entities simultaneously or otherwise. For example, functionality may be described as being performed by a processor. One skilled in the art will appreciate that this functionality can be performed by different processor types (e.g., a single-core processor, quad-core processor, etc.), different processor quantities (e.g., one processor, two processors, etc.), a processor with other entities (e.g., a processor and storage), a non-processor entity (e.g., mechanical device), and others.

In addition, unless otherwise stated, functionality described as a system may function as part of a method, an apparatus, a method executed by a computer-readable medium, and other embodiments may be implemented in other embodiments. In one example, functionality included in a system may also be part of a method, apparatus, and others.

Where possible, example items may be combined in at least some embodiments. In one example, example items include A, B, C, and others. Thus, possible combinations include A, AB, AC, ABC, AAACCCC, AB, ABCD, and others. Other combinations and permutations are considered in this way, to include a potentially endless number of items or duplicates thereof.

What is claimed is:

1. A system, comprising:
a processor operatively coupled with non-transitory computer readable media, the non-transitory computer readable media configured to implement at least a portion of:
a monitor component that determines an observation of user behavior related to at least one of an old software edition, a new software edition, or a combination thereof;
a creation component that produces an intermediary software edition based, at least in part, on information representing one or more users and the observation,
the intermediary software edition includes at least one old visual element of the old software edition and at least one new visual element of the new software edition,
the at least one old visual element effects calls to an old functionality of the old software edition,
the intermediary software edition sends information related to calls to the old functionality to at least a portion of the old software edition for execution,
the at least one new visual element effects calls to a new functionality of the new software edition,
the at least one new visual element is compared to the at least one old visual element and scored according to a point system into a sum of points based on a complexity of a difference between the at least one new visual element and the at least one old visual element,
the at least one new visual element is provided in the intermediary software edition based on the sum of points associated with the at least one new element not crossing a complexity point threshold, and
the intermediary software edition sends information related to calls to the new functionality to at least a portion of the new software edition for execution; and
an output component that discloses the intermediary software edition, the intermediary software edition displays a result of execution of a call to at least one of the old functionality and the new functionality.

2. The system of claim 1, where the intermediary software edition is a first interface, where the new software edition is a second interface, where the old software edition is a third interface, and where the first interface is made up of visual elements from the second interface and the third interface.

3. The system of claim 1, comprising:
a rollback component that transitions from a current interface to a previous-based interface, where at least one of the current interface or the previous-based interface is the intermediary software edition.

4. The system of claim 3, wherein the rollback component transitions from a current interface to a previous-based interface based on deviations from a normal usage pattern in gathered user performance data.

5. The system of claim 1, the monitor component further determines an intermediary observation of intermediary user behavior related to at least one the intermediary software edition, the intermediary observation statistically quantifies a usage pattern of a user.

6. The system of claim 5, where the intermediary observation includes how an entity responds to a previously presented intermediary software edition that forwards use of the new software edition over the old software edition.

7. The system of claim 5, where the observation includes an analysis of a historical record of how an entity group responds to at least one previously presented intermediary software edition, the entity group including two or more people who interacted with the intermediary software edition.

8. The system of claim 5, comprising:
a modification determination component that determines if the intermediary software edition should be modified based, at least in part, on the intermediary observation identifying a deviation from a normal usage pattern of the user;
a modification decision component that determines a manner on how to modify the intermediary software edition based, at least in part, on the intermediary observation, where the modification decision component operates in response to the modification determination component determining that the intermediary software edition should be modified; and
a modification performance component that modifies the intermediary software edition according to the manner, where the intermediary software edition is an interface.

9. The system of claim 1, comprising:
an examination component that monitors a response of an entity to the intermediary software edition; and
a development component that creates a training program for the entity based, at least in part, on the response,
the training program assists in a user locating functionality in at least one of the intermediary software edition or the new software edition.

10. The system of claim 9, comprising:
an evaluation component that analyzes the response; and
a creation determination component that determines if the training program should be created, where the development component creates the training program in response to a determination being that the training program should be created.

11. The system of claim 1, the intermediary software edition includes at least one visual element that is not an exact old visual element of the old software edition and is not an exact new visual element of the new software edition.

12. The system of claim 1, the creation component produces the intermediary software edition without employment of an overlay technique.

13. A method, comprising:
reading a nontransitory computer readable medium, the nontransitory computer readable medium including instructions to perform at least a portion of:
analyzing at least a first interface associated with a first software and a second interface associated with a second software to produce an interface analysis result, the analysis result scored according to a sum of points based on differences between the first interface and the second interface;
identifying an old function accessible through the first interface which is not accessible through the second interface;
displaying an intermediary interface in place of the second interface for the second software including a transformation of at least one first constituent element of the first interface to at least one second constituent element of the second interface based, at least in part, on the sum of points from the interface analysis result not crossing a complexity point threshold and information representative of at least one user;

receiving a request for the old function through the intermediary interface;

calling the first software in response to the request to have the first software execute the old function; and displaying information returned from the old function through the intermediary interface.

14. The method of claim 13, where the transformation forwards use of a subsequent interface over use of a previous interface, where the previous interface is one of the first interface and the second interface.

15. The method of claim 14, comprising:

accessing an interface history including response information related to a user interaction with at least the first interface, and analyzing the interface history to produce an interface history analysis result, where the interface analysis result comprises the interface history analysis result.

16. The method of claim 13, further comprising:

creating a training program for the at least one user based, at least in part, on an analysis of user interaction with the first interface, where the training program provides training information to perform similar actions with second interface as the at least one user previously performed in the first interface.

17. The method of claim 13, further comprising reverting transformation of the at least one first constituent element of the first interface from the at least one second constituent element of the second interface based on deviations from a normal usage pattern in gathered user performance data.

18. A system, comprising:

a processor operatively coupled with non-transitory computer readable media, the non-transitory computer readable media configured to implement at least a portion of:

an analysis component that analyzes a first interface associated with an old software version and a second interface associated with a new software version to produce an analysis result, the analysis result is scored according to a sum of points based on the differences between the first interface and the second interface; and a selection component that makes a determination on if a transition training sequence should be created based at least in part on the sum of points from the analysis result crosses a point threshold, where the transition training sequence comprises at least one intermediary interface that displays an animation of a visual transformation corresponding to a functional transformation between the first interface and the second interface, the animation animates at least one first constituent element of the first interface changing to at least one second constituent element of the second interface based, at least in part, on the analysis result and information representative of at least one user, where differences between the at least one first constituent element and the at least one second constituent element result in the sum of points crossing the point threshold, where the first constituent element is associated with a function of the old software version and the second constituent element is associated with the new software version, and where the animation is triggered by calling the old function using the at least one intermediary interface.

19. The system of claim 18, comprising:

a resolution component that produces a decision for a content of the transition training sequence including a number of intermediary interfaces to be produced transitioning between the first interface and the second interface, the decision based at least in part on the analysis result, where the resolution component operates in response to a determination being that the transition training sequence should be created comprising two or more intermediary interfaces; and a production component that creates the transition training sequence with the content, where the transition training sequence trains an entity to use the second interface, where the entity previously used the first interface.

20. The system of claim 18, comprising:

a monitor component that monitors implementation of the transition training sequence to create a monitor result;

a change determination component that makes a change determination on if the transition training sequence should change after implementation of at least part of the transition training sequence, where the change determination is based, at least in part, on the monitor result including deviations from a normal usage pattern in gathered user performance data;

a decision component that makes an alteration determination, where the alteration determination is how to change the transition training sequence, where the alteration determination is based, at least in part, on the monitor result, and where the decision component operates in response to the change determination being that the transition training sequence should change; and an alteration component that causes the transition training sequence to be altered according to the alteration determination.

* * * * *